United States Patent
Kikuta et al.

(10) Patent No.: US 6,600,114 B2
(45) Date of Patent: Jul. 29, 2003

(54) STEERING WHEEL HORN SWITCH

(75) Inventors: Mitsuhiro Kikuta, Nishikasugai-gun (JP); Yoshiyuki Fujita, Nishikasugi-gun (JP); Hiroshi Yasuda, Nishikasugi-gun (JP); Naohiko Ishiguro, Nishikasugi-gun (JP); Atsushi Nagata, Nishikasugi-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/994,658

(22) Filed: Nov. 28, 2001

(65) Prior Publication Data

US 2002/0079203 A1 Jun. 27, 2002

(30) Foreign Application Priority Data

Nov. 29, 2000 (JP) ........................................ 2000-362356
Mar. 26, 2001 (JP) ........................................ 2001-088703

(51) Int. Cl.[7] ................................................ H01H 9/00
(52) U.S. Cl. ................................ 200/61.55; 200/61.54; 280/731
(58) Field of Search ........................... 200/61.54–61.56; 280/728.1, 728.2, 731; 74/552

(56) References Cited

U.S. PATENT DOCUMENTS 6,139,051 A * 10/2000 Fujita ...................... 200/61.55

FOREIGN PATENT DOCUMENTS

JP    10-106382    4/1998

* cited by examiner

Primary Examiner—Elvin Enad
Assistant Examiner—Marina Fishman
(74) Attorney, Agent, or Firm—Posz & Bethards, PLC

(57) ABSTRACT

A steering wheel horn switch includes two contact members and a support member, which supports the contact member and is formed from a light metallic material, and the contact member and the support member are electrically conducted to each other in such a manner to form a horn operating circuit. An electric conductor having electrical conductivity, which is higher than the electrical conductivity of the support member, is disposed between the contact member and the support member in such a way as to come in contact with both the contact member and the support member. The electric conductor is in contact with the support member so that the contact area therebetween is larger than the contact area between the contact member and the support member in the case when the contact member is singly brought into contact with the support member, or so that the electric conductor is brought into contact with the support member by being pushed by the support member.

5 Claims, 21 Drawing Sheets

STEERING WHEEL HORN SWITCH

BACKGROUND OF THE INVENTION

1. Field of the Invention

The present invention relates to a horn switch disposed on a steering wheel for a vehicle. More particularly, the invention relates to a horn switch that has two contact members and a support member, which is made of a light metallic material supporting one of the contact members, and that is enabled to operate a horn by bringing the contact members into contact with each other.

The present application is based on Japanese Patent Applications No. 2000-362356 and 2001-088703 and, which are incorporated herein by reference.

2. Description of the Related Art

As is known from Unexamined Japanese Publication No. Hei. 10-106382, a conventional horn switch of this kind is configured by comprising a stationary base portion, which supports a stationary contact member and is supported by a steering wheel body, and a movable base portion serving as a support member connected to a horn pad. The movable base portion is formed on a bag holder, on which an air bag device is disposed, and placed above the stationary base portion in such a way as to support the movable contact member that is enabled by being brought into contact with the stationary contact member to operate a horn. A forcing means for upwardly pushing the movable base portion is disposed between the movable base portion and the stationary base portion so that the movable contact member gets apart from the stationary contact member. The horn switch is constructed so that a pushing force of this forcing means pushes the movable contact member against the movable base portion. Further, usually, the bag holder having the movable base portion is formed from sheet plate.

Recently, it is desired from the viewpoint of reducing the weight of the air bug device that the bag holder be formed from a light metal, such as magnesium and aluminum. However, light metal is likely to be oxidized on the surface thereof. The movable contact member is constructed in such a way as to be press-contacted with the movable base portion only by a pushing force of the forcing means when the movable contact member formed from light metal is oxidized on the surface of a portion thereof near to the part thereof, which is in contact with the movable contact member. Thus, the contact state between the movable contact member and the movable member is liable to be poor. Consequently, it is difficult to ensure stable operability of the horn switch.

SUMMARY OF THE INVENTION

In view of the aforementioned drawbacks, an object of the invention is to provide a steering wheel horn switch enabled to ensure stable operability thereof even when a light metallic material is employed as the material thereof.

To achieve the foregoing object, according to the invention, there is provided a horn switch that is a steering wheel horn switch having two contact members enabled to operate a horn by being brought into contact with each other, and a support member, formed from a light metallic material, for supporting one of the contact members, wherein a coil spring being disposed between the contact members and adapted to push the one of the contact members against the support member in such a way as to cause the one of the contact members to get apart from the other, and wherein the one of the contact members and the support member being electrically conducted to each other in such a way as to be able to form a horn operating circuit. The steering wheel horn switch, characterized in that:

an electric conductor having electric conductivity, which is higher than that of the support member is disposed between the between the one of the contact members and the support member in such a manner as to come into contact with both of the other of the contact members and the support member, and that the electric conductor is adapted to increase a contact area between the electric conductor and the support member so that the contact area therebetween is larger than a contact area between the other of the contact members and the support member in a case that the other of the contact member is singly brought into contact with the support member, or adapted to come into contact with the support member by being pushed by the other of the support member.

Further, in the case of an embodiment of this horn switch, it is preferable that the steering wheel has a steering wheel body and an air bag device, that the air bag device has a bag holder formed from a light metallic material, that the support member is constructed as a movable base portion disposed on the bag holder, that the contact members include:
  a stationary contact member supported on a top surface side of a stationary base portion placed at a side of the steering wheel body; and
  a movable contact member supported on a bottom surface side of the movable base portion placed above the stationary base portion, that the electric conductor is formed from a material, whose stiffness is higher than that of the support member, and placed between the movable contact member in such a way as to come in contact with both of the movable contact member and the movable base portion, that a connection bolt is placed between the movable base portion and the stationary base portion in such a manner as to allow the movable base portion to downwardly move and as to restrict a separation distance from the stationary base portion to the movable base portion, that the connection bolt has a head portion, which abuts against the bottom surface side of the stationary base portion, and a shank portion that upwardly extends from the head portion and is screwed into a screw hole formed in the movable base portion, that the shank portion comprises a small-diameter male screw part, which is screwed into the screw hole formed in a tip end thereof, and a substantially cylindrical large-diameter part formed in the head portion, that the movable contact member and the stationary contact member each have an insertion hole, through which the shank portion of the connection bolt is able to be inserted, and are substantially cylindrically shaped, and that the male screw part is screwed into the screw hole so that the large-diameter part of the connection bolt abuts against the electric conductor.

Moreover, it is preferable that the electric conductor is constituted as a nut that is embedded in the movable base portion as an insert when the bag holder is formed by casting, and that the nut has the screw hole, into which the male screw part of the connection bolt is able to be screwed, and is enabled to abut against the large-diameter part of the connection bolt.

Furthermore, it is preferable that the electric conductor is constituted as a plate disposed between the movable contact member and the movable base portion in such a way as to come in contact with both of the movable contact member and the movable base portion, and that the plate is constructed in such a way as to have an insertion hole connected to the screw hole thereby to enable the male screw part to pass therethrough and as to be able to abut against the large-diameter part of the connection bolt.

Additionally, it is preferable that the plate is temporarily fixed to the connection bolt or the movable contact member.

According to the horn switch of the invention, the electric conductor, which is more resistant to oxidizing and has higher electric conductivity in comparison with the support member, intervenes between the one of the contact members and the support member in such a manner as to come into contact with both of this contact member and the support member. Thus, the contact member comes into contact with the electric conductor. Then, the support member and the electric conductor are brought into contact with each other. Therefore, even in the case where the horn switch is constructed so that the movable contact member is press-contacted with the electric conductor only by the pushing force of the coil spring, the electric conductor is reliably conducted from the contact member even when operated. Moreover, the electric conductor is in contact with the support member by increasing the contact area between the electric conductor and the support member in such a way as to be larger than the contact area between the support member and the one of the contact members, or by being pushed against the support member so that a conductive condition, in which the one of the contact members is electrically conducted to the support member, is better than the conductive condition in the case of allowing one of the contact members to singly come in contact with the support member. Thus, even when the surface of the support member is oxidized, the ability to electrically conduct the electric conductor to the support member is ensured. Consequently, the stable operability of the horn switch is ensured.

Further, according to the embodiment of the horn switch, even when the connection bolt is screwed to the movable base portion, the large-diameter part of the connection bolt is caused to abut against the electric conductor having stiffness, which is higher than that of the support member, instead of the support member that is formed from a light metallic material and liable to deform. Thus, the connection bolt is firmly screwed thereto, so that backlash or looseness is prevented from occurring when the connection bolt is screwed thereto. Consequently, a sufficient mounting strength of the horn switch is ensured.

Moreover, in the case where the electric conductor is constituted as a nut that is embedded in the movable base portion as an insert when the bag holder is formed by casting, and where the nut has the screw hole, into which the male screw part of the connection bolt is able to be screwed, and is enabled to abut against the large-diameter part of the connection bolt, the nut is embedded in the movable base portion. Thus, the surface of the movable base portion is resistant to oxidizing. Consequently, the contact between the nut and the movable base portion is stabilized. Moreover, higher ability to electrically conduct the contact member to the support member is ensured.

Furthermore, in the case where the electric conductor is constituted as a plate disposed between the movable contact member and the movable base portion in such a way as to come in contact with both of the movable contact member and the movable base portion, and where the plate is constructed in such a way as to have an insertion hole connected to the screw hole thereby to enable the male screw part to pass there through and as to be able to abut against the large-diameter part of the connection bolt, the connection bolt is screwed thereto, so that the plate is pushed against the movable base portion. Thus, the contact between the plate and the movable base portion is ensured. Further, sufficient conductivity is secured. Moreover, the manufacturing cost of the horn switch is reduced, as compared with that in the case that the nut is embedded in the movable base portion as an insert.

Besides, in the case where the horn switch is constructed so that the plate is temporarily fixed to the connection bolt or the movable contact member, the connection bolt is screwed into the screw hole in a state in which the plate is by preliminarily and temporarily assembling the plate to the connection bolt or the movable contact member, so that the plate is held by the connection bolt or the movable contact member.

Features and advantages of the invention will be evident from the following detailed description of the preferred embodiments described in conjunction with the attached drawings.

DETAILED DESCRIPTION OF THE PREFERRED EMBODIMENTS

Hereinafter, an embodiment of the invention is described with reference to the accompanying drawings.

Figure 1:
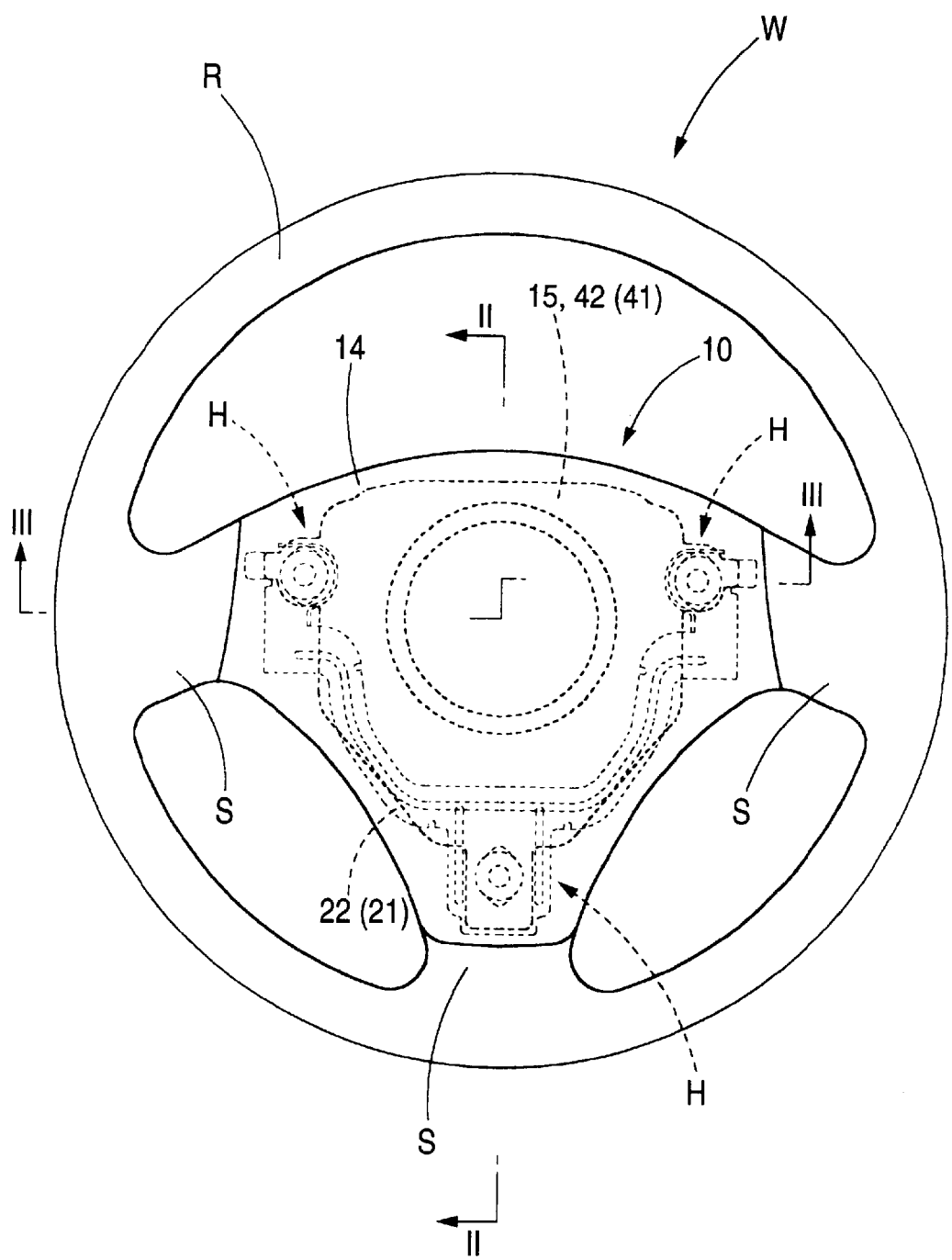
FIG. 1 is a plan view illustrating a steering wheel in which horn switches according to an embodiment of the invention are used.
Figure 2:
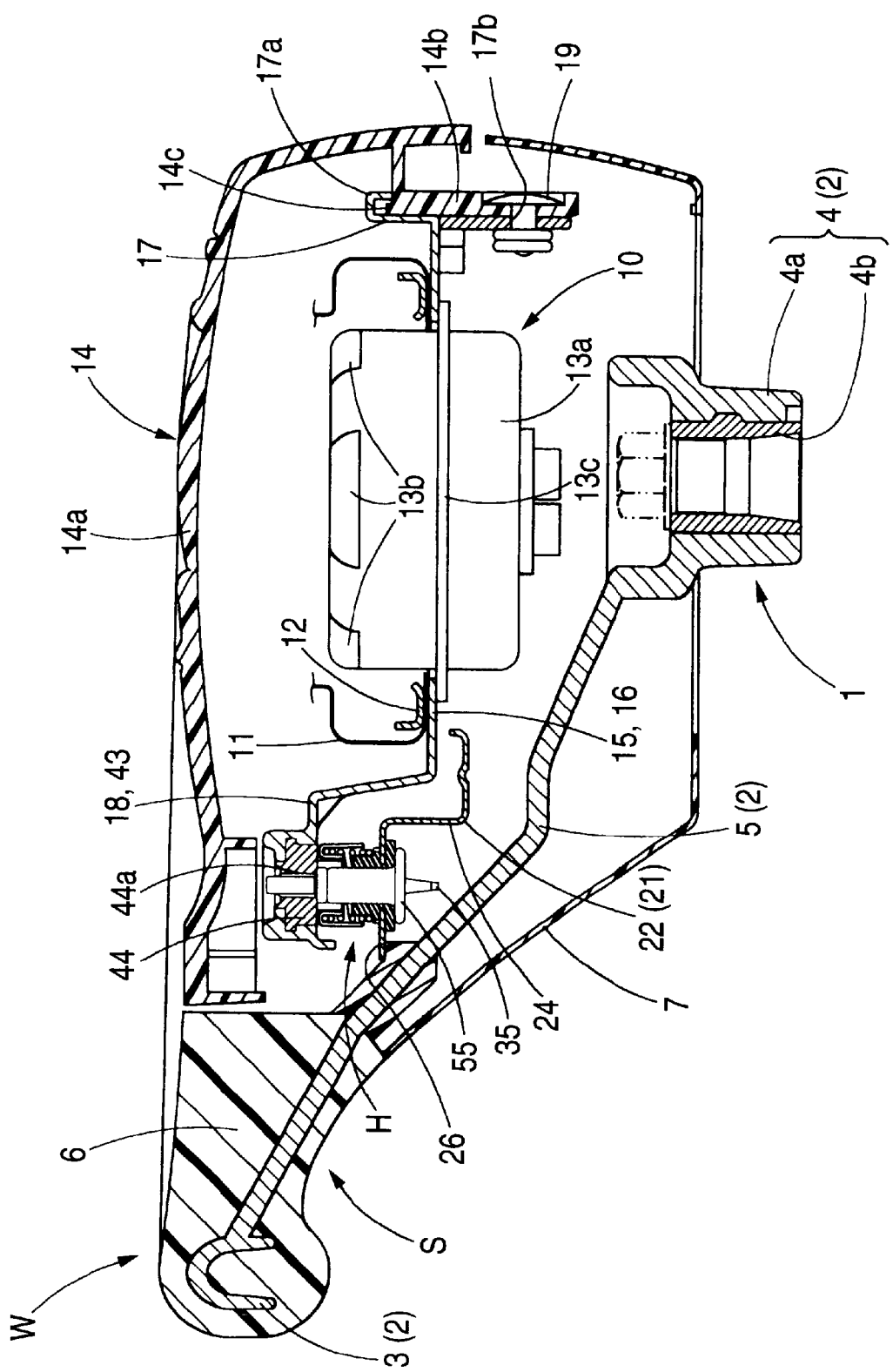
FIG. 2 is a schematic sectional view illustrating the steering wheel according to this embodiment, which is taken along part of the line II—II of FIG. 1.
Figure 3:
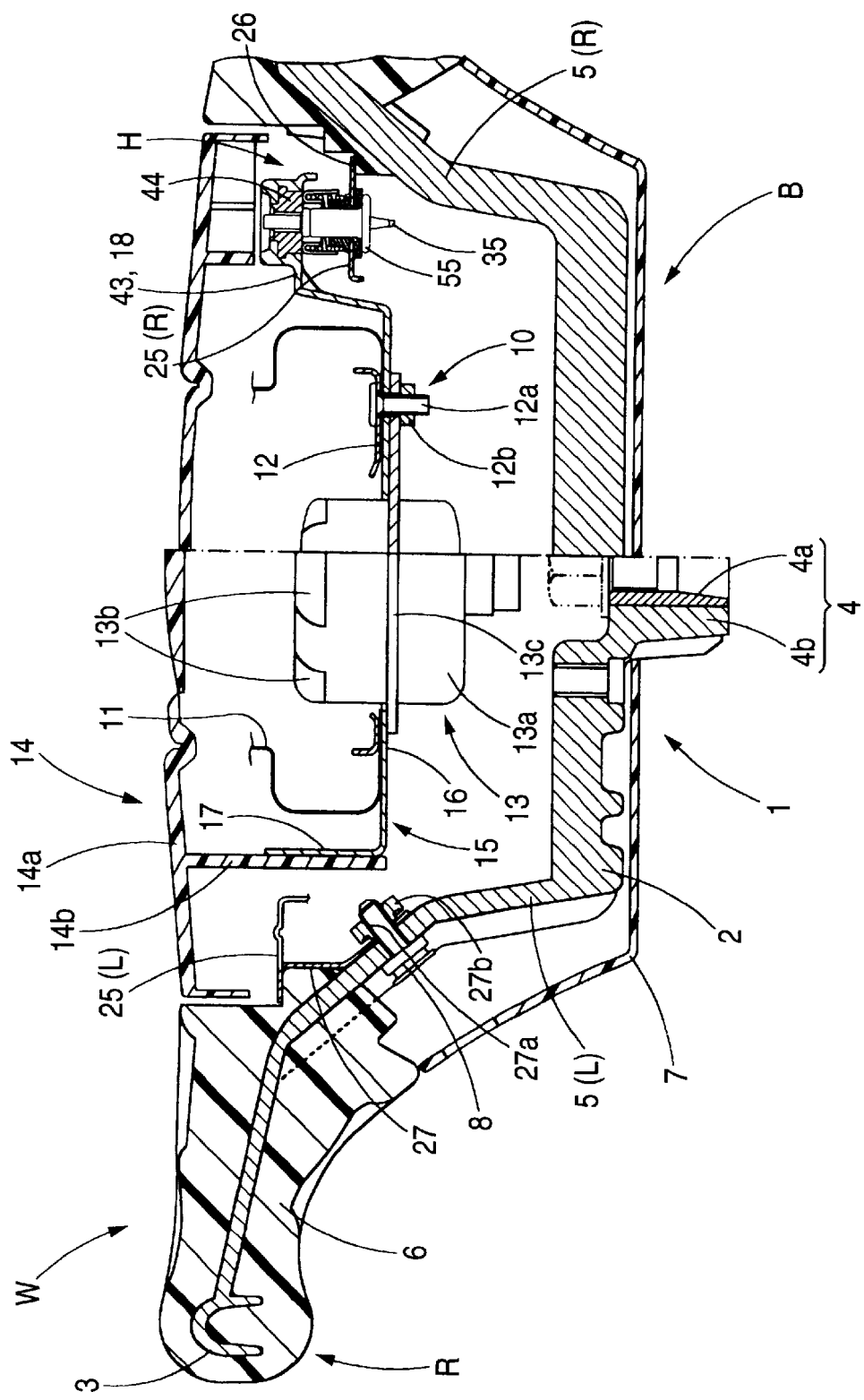
FIG. 3 is a schematic sectional view illustrating this steering wheel, which is taken along part of the polygonal line III—III of FIG. 1.

A steering wheel W using horn switches H, each of which is the embodiment of the invention, comprises an annular ring portion R, a boss portion B placed at the center of the ring portion R, three spoke portions S for connecting the ring portion R to the boss portion B, as shown in FIGS. 1 to 3. Component parts of the steering wheel W include a steering wheel body 1, an air bag device 10 placed in an upper part of the boss portion B, and horn switches H, each of which is connected to the steering wheel body 1 and which supports the air bag device 10.

The steering wheel body 1 is a part obtained by excluding the air bag device 10 and the horn switches H from the steering wheel W and has a core metal 2 disposed in such a way as to connect the ring portion R, the boss portion B, and the spoke portion S to one another. A ring portion core metal 3 of the core metal 2, and each of spoke portion core metals 5 at the side of the ring portion core metal 3 are coated with a synthetic resin cover layer 6. A core metal 4 provided at a part of the boss portion B comprises a steel boss 4a connected to a steering shaft (not shown), and a cover portion 4b made of an aluminum alloy and formed in such a way as to be integral with the ring portion core metal 3 and the spoke portion core metals 5 and as to cover the peripheral portion of the boss 4a. Incidentally, the steering wheel body 1 is constituted by having a lower cover 7 to be screwed to the core metal 2 in such a manner as to cover a lower part of the boss portion B.

The air bag device 10 comprises an expandably folded bag-like air bag 11, an inflator 13 for supplying expanding gas to the air bag 11, a pad 14 for covering the folded air bag 11, and a bag holder 15 for holding the air bag 11, the inflator 13, and the pad 14, as shown in FIGS. 2 and 3.

The inflator 13 is constituted by comprising a substantially cylindrical body portion 13a having a gas outlet 13b provided at an upper portion thereof, and a flange portion 13c projected from an outer circumferential surface of the body portion 13a.

The pad 14 is constructed by comprising a ceiling wall portion 14a, which is made of a synthetic resin and adapted to break at a predetermined part when the air bag 11 is expanded, and a sidewall portion 14b that extends downwardly from a place near to an outer peripheral edge of the ceiling wall portion 14a and that is shaped substantially like a hexagonal prism. A locking portion 14c (see FIG. 2) for locking a locking claw 17a formed on a sidewall portion 17 of the bag holder (to be described later) 15 is formed at a predetermined place on the inner circumferential surface of the sidewall portion 14b. Further, a plurality of ribs (not shown) abutting against a mounting piece portion 18 (that is, a movable base portion 43) of the bag holder 15 (to be described later) are formed on the bottom surface of the ceiling wall portion 14a.

The bag holder 15 holds the air bag 11 and the inflator 13 by causing four bolts 12a (see FIGS. 3 and 4), which extend downwardly and are provided on an annular retainer 12 placed in the air bag 11, to penetrate through the air bag 11, the bag holder 15, and the flange portion 13c of the inflator 13 and by then screwing each of these bolts 12a into a corresponding nut 12b. Further, the bag holder 15 holds the pad 14 by fastening the pad sidewall portion 14b with a rivet 19 and locking the locking claw 17a onto the locking portion 14c.

In view of weight reduction and formability, as shown in FIGS. 2 to 5, the bag holder 15 is formed from a diecasting product made of a light metallic material, such as magnesium and an aluminum alloy, and constituted by comprising a transverse plate portion 16 having an insertion hole 16a, into which an inflator body portion 13a can be inserted from below, in the central portion thereof, and also comprising a sidewall portion 17 extending upwardly and downwardly from a front edge of the transverse plate portion 16 and from both the lateral sides near to a rear edge thereof. Through holes 16b, through each of which corresponding bolt 12a of the retainer 12 is inserted, are formed around the insertion hole 16a of the transverse plate portion 16. Further a movable base portion 43 (to be described later) serving as a support member is formed on the bag holder in such a way as to be integral therewith.

A locking claw 17a to be locked on the locking portion 14c of the pad sidewall portion 14b is formed at a predetermined place on each of the sidewall portions 17. Further, a mounting hole 17b (see FIG. 2) to be used for fastening the pad sidewall portion 14b with a rivet 19 is formed at a predetermined place.

Three mounting piece portions 18 extending outwardly and laterally are formed at the top end of each of the sidewall portions 17. Each of these mounting piece portions 18 constitutes the movable base portion (or support member (to be described later)) 43 of the corresponding horn switch H. Each of the movable base portions 43 is constructed so that each of the nuts 44 serving as electric conductors (to be described later) is embedded therein. A screw hole 44a, into which a connection bolt 55 is screwed, is formed in each of the nuts 44.

Further, a lead wire (not shown) is connected to the bag holder 15 so that the bag holder 15 is electrically conducted to a positive electrode of a horn operating circuit.

Figure 11:
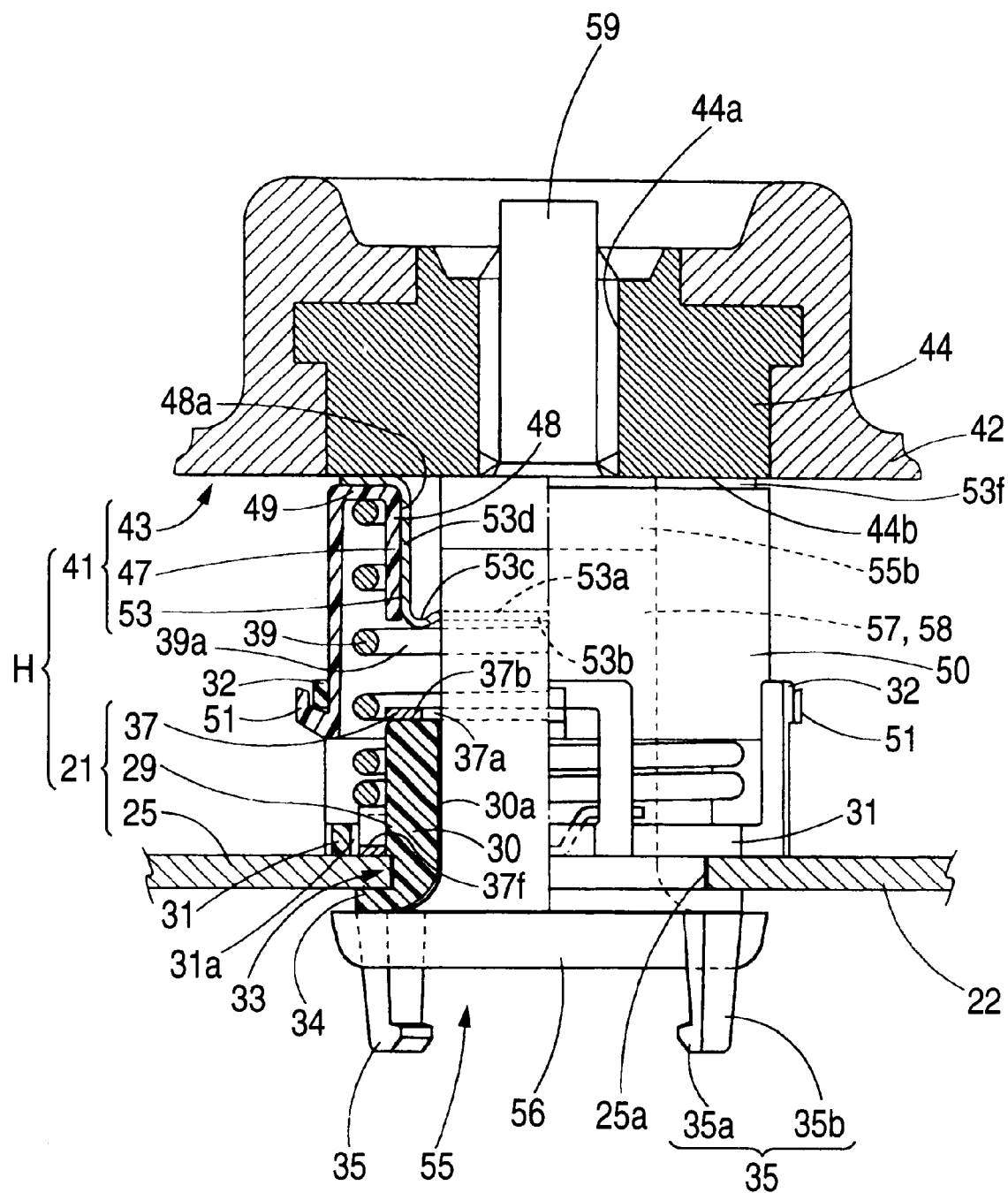
FIG. 11 is an enlarged partly sectional view illustrating the manner of use of each of the horn switches of this embodiment.
Figure 12:
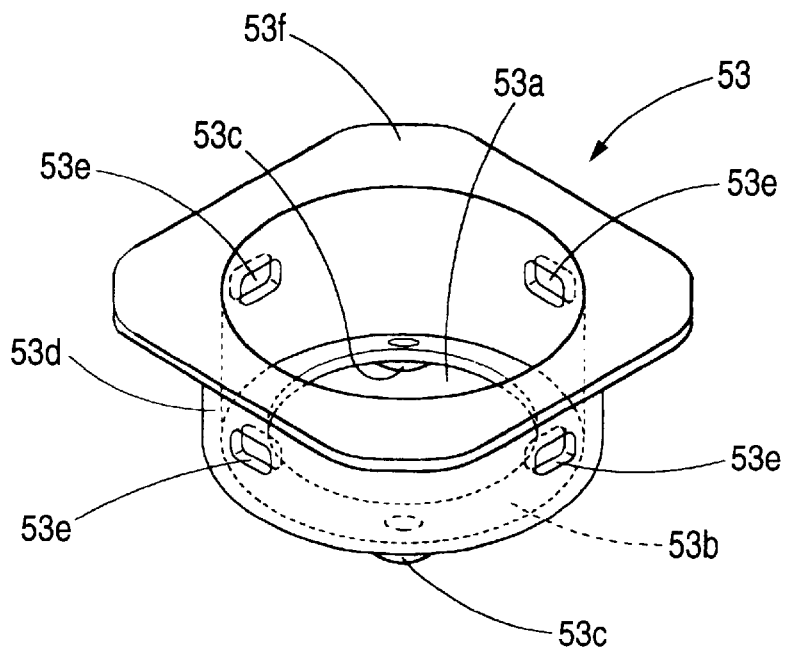
FIG. 12 is a perspective view illustrating a movable contact member of this embodiment.
Figure 13:
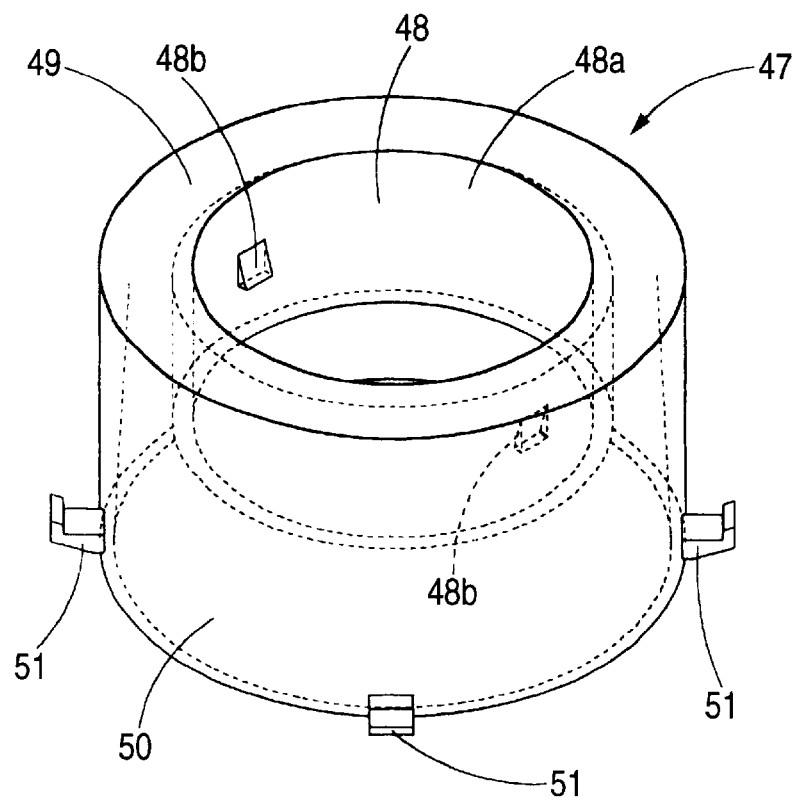
FIG. 13 is a perspective view illustrating a movable support member of the embodiment.
Figure 14:
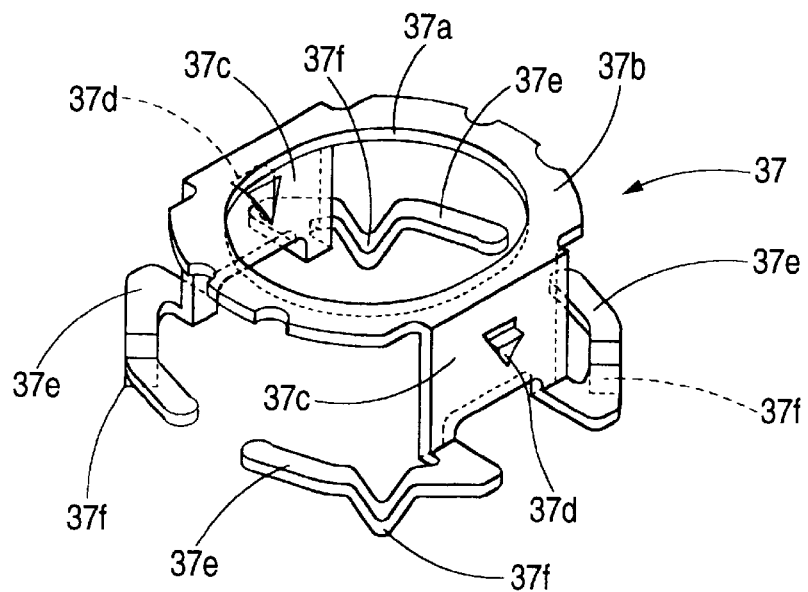
FIG. 14 is a perspective view illustrating a stationary contact member of the embodiment.
Figure 15:
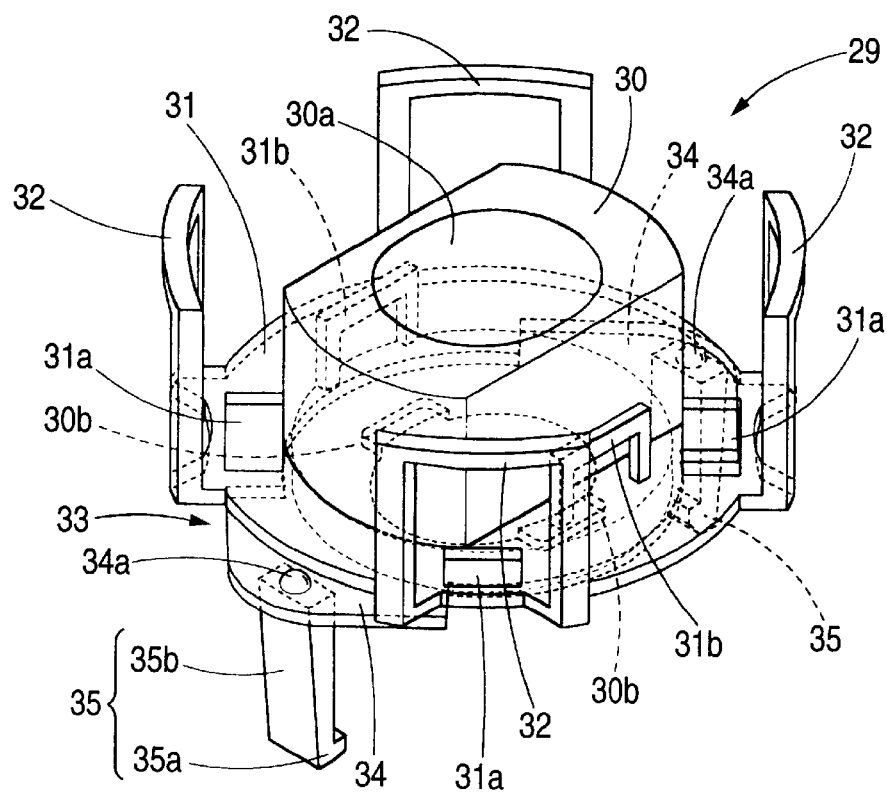
FIG. 15 is a perspective view illustrating a stationary support member of this embodiment.
Figure 16:
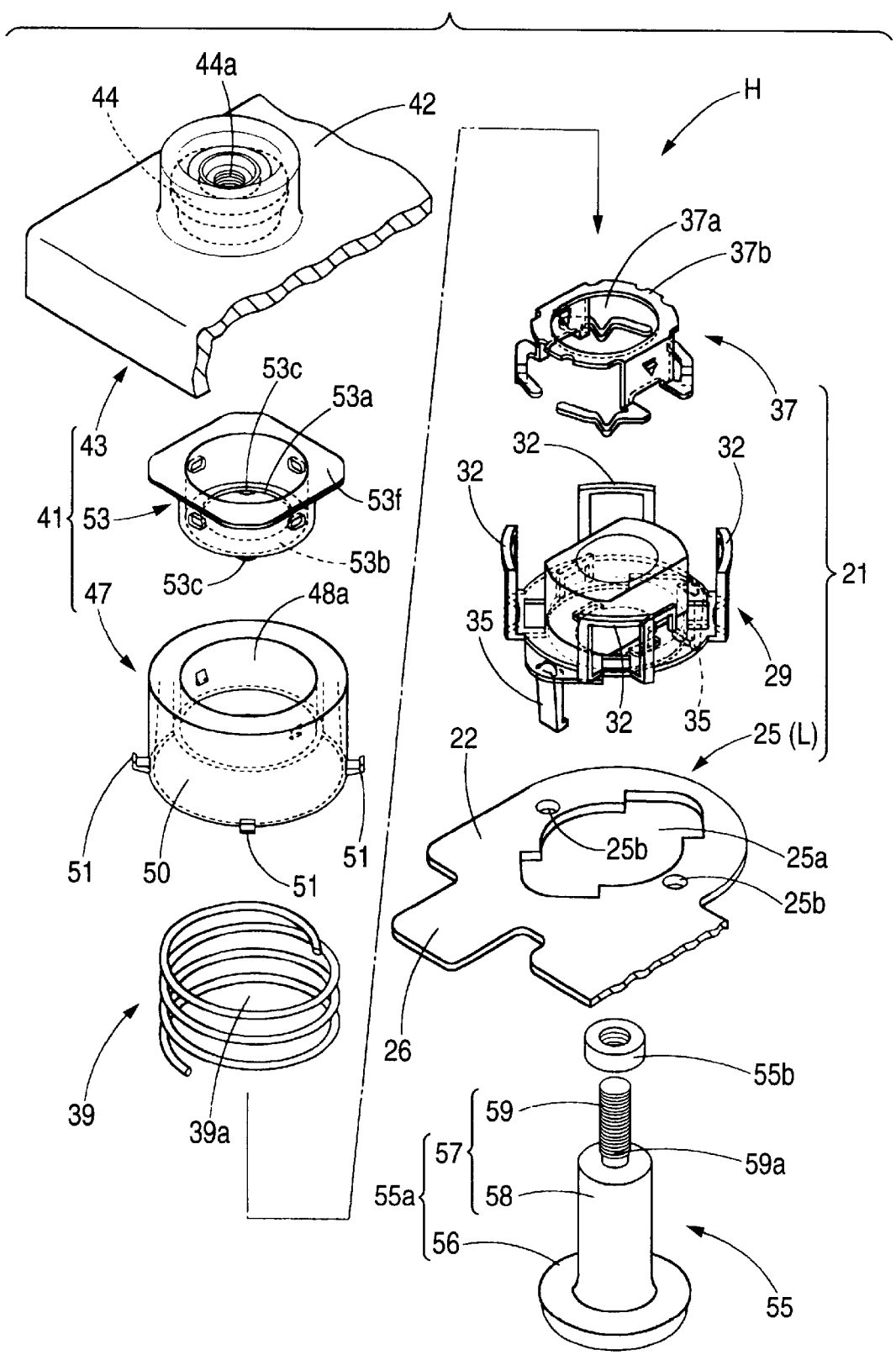
FIG. 16 is an exploded perspective view illustrating each of horn switches of this embodiment.

As shown in FIGS. 1 to 4, the horn switches H of the embodiment are disposed at three places on the back surface side of the circumferential edge of the pad 14, each of which is located in the vicinity of each of the spoke portions S. As illustrated in FIGS. 11 and 16, each of the horn switches H is constituted by comprising a stationary member 21, a movable member 41, a spring 39, and a connection bolt 55. The stationary member 21 has a stationary contact member 37 and is supported on the steering wheel body 1. The movable member 41 has a movable contact member 53 enabled to operate the horn by coming into contact with the stationary contact member 37. The movable member 41 is placed above the stationary member 21. The spring 39 serves as a coil spring, and is disposed between the stationary member 21 and the movable member 41, and upwardly pushes the movable contact member 53 in such a manner as to cause the movable contact member 53 to get apart from the stationary contact member 37. The connection bolt 55 permits the movable member 41 to downwardly move, and connects the movable member 41 to the stationary member 21 in such a way as to restrict the separation distance from the stationary contact member 37 to the movable contact member 53.

Further, as shown in FIGS. 11 and 16, the stationary member 21 is constituted by comprising a stationary base portion 25, which is connected to the steering wheel body 1, and a stationary support member 29 that is connected to the stationary base portion 25 and supports the stationary contact member 37.

Figure 4:
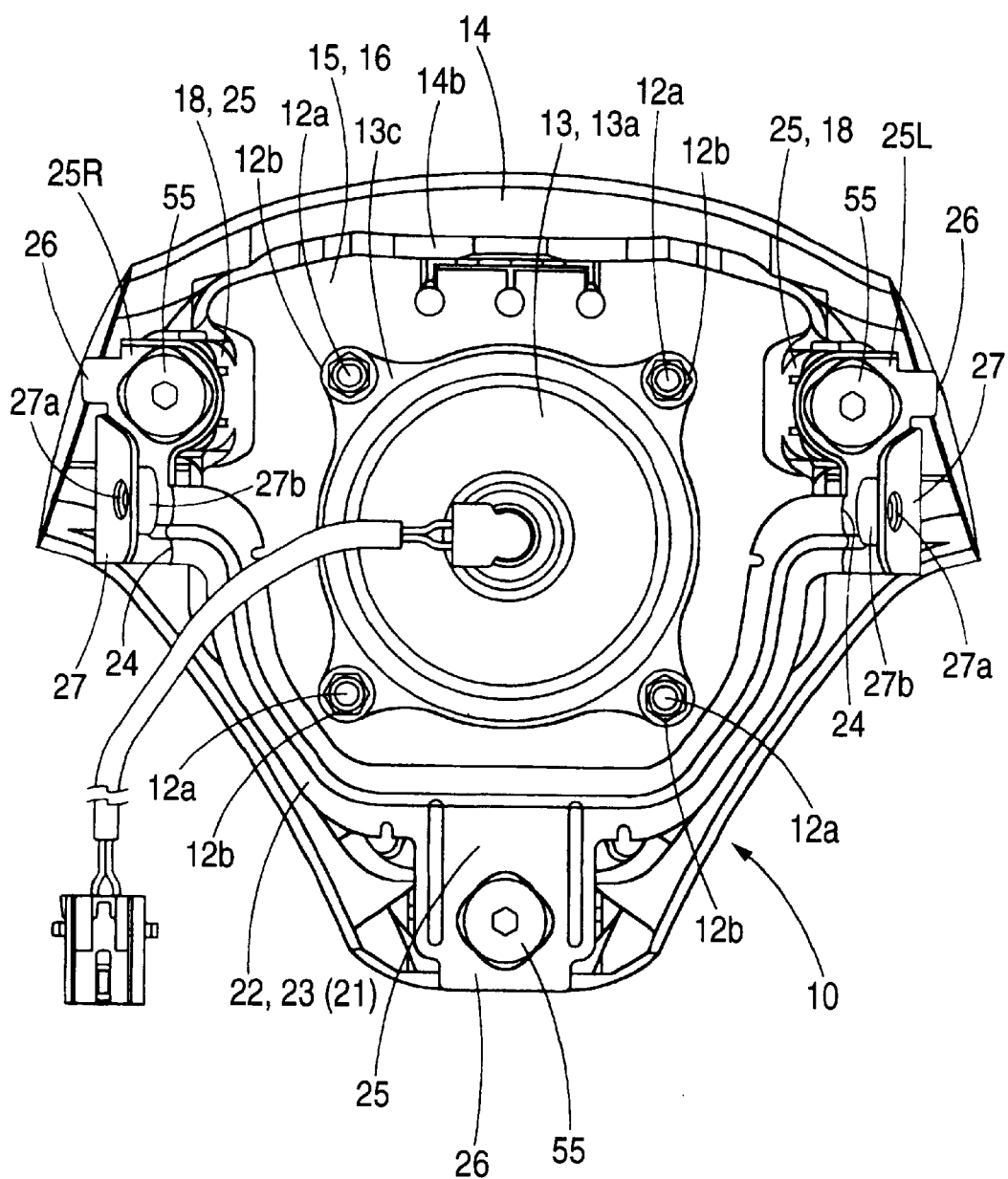
FIG. 4 is a bottom view illustrating an air bag device to which the horn switches according to this embodiment are assembled.
Figure 5:
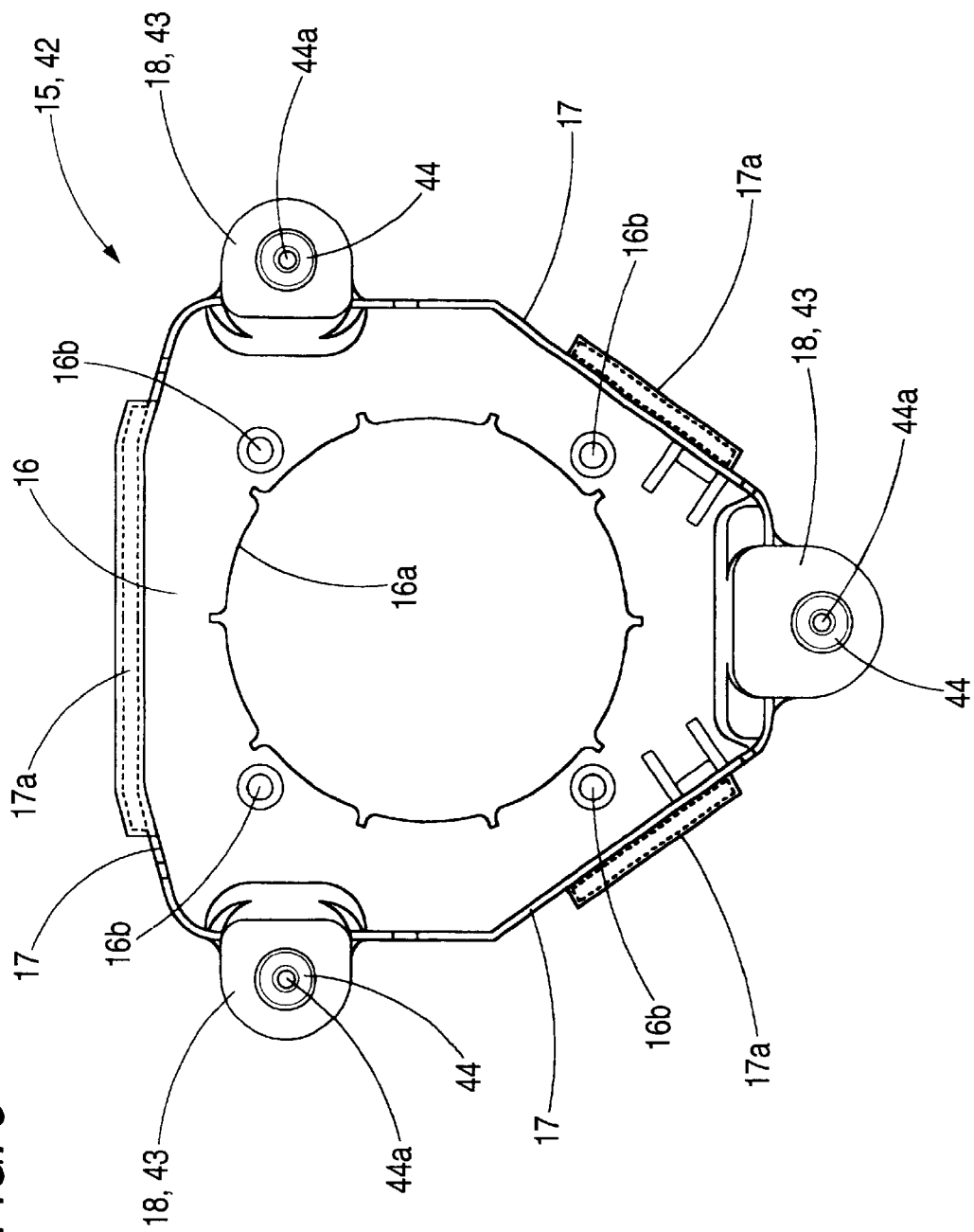
FIG. 5 is a plan view illustrating a movable plate of a movable member of each of the horn switches of this embodiment.
Figure 6:
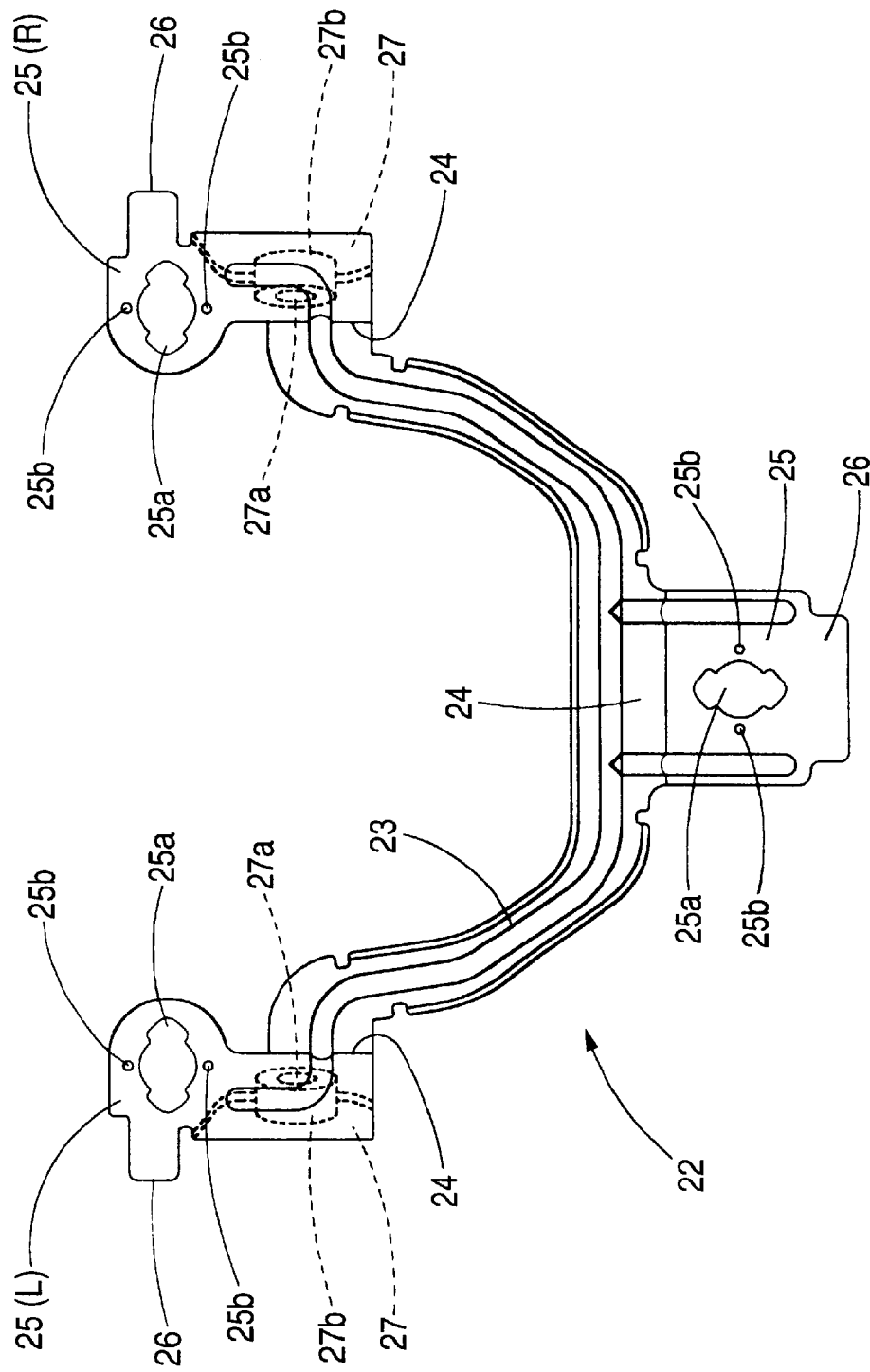
FIG. 6 is a plan view illustrating a movable plate of a stationary member of each of the horn switches of this embodiment.
Figure 7:
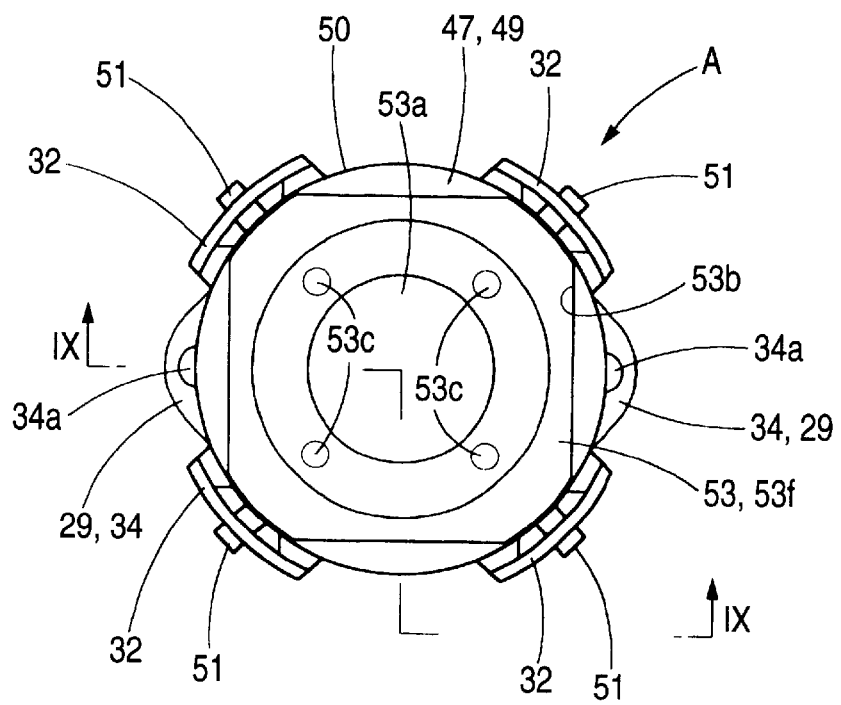
FIG. 7 is a plan view illustrating a switch assembly of this embodiment.
Figure 8:
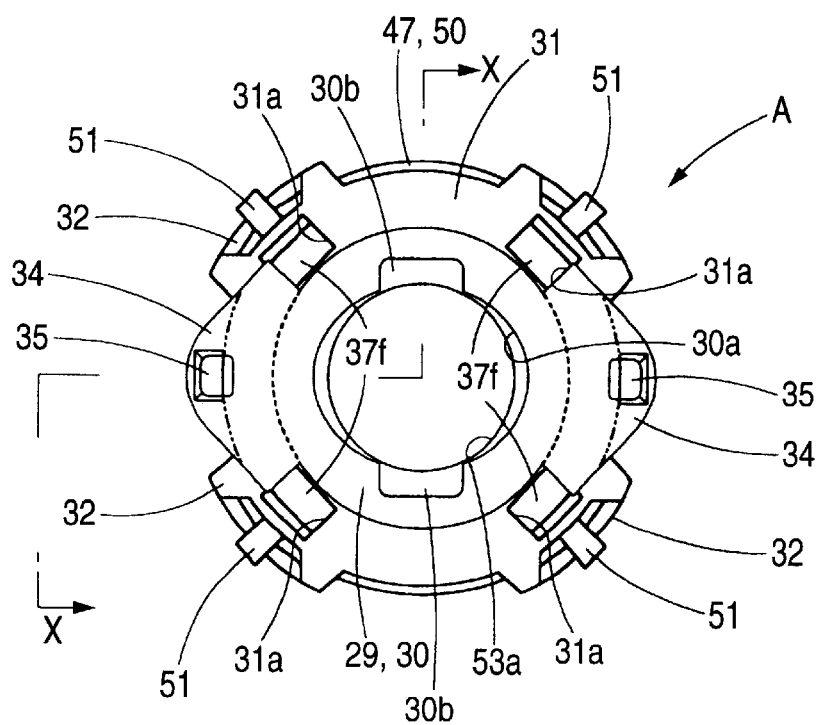
FIG. 8 is a bottom view illustrating a switch assembly of this embodiment.

Incidentally, in the case of the embodiment, as illustrated in FIGS. 1, 4, and 6, the stationary base portions 25 disposed at the three places are formed by being connected to the stationary plate 22 made of single sheet metal. The stationary plate 22 is constituted by comprising a connecting rod portion 23, which has a U-shaped horizontal section when seen from above, and also comprising three longitudinal plate portions 24 extending upwardly from the connecting rod portion 23, and three stationary base portions 25 each extending laterally and outwardly from the top end of a corresponding one of the longitudinal plate portions 24.

Further, a mounting hole 25a is formed in the central part of each of the stationary base portions 25 by opening substantially right-angled triangular holes at positions, which are symmetrical with respect to the center of a circular hole, such that an oblique side of each of the triangular holes is connected to the circular hole. Further, two locking holes 25b are formed around each of the mounting holes 25a in such a way as to penetrate through the corresponding base portion 25. Moreover, a support piece portion 26, which abuts against the cover layer 6 of the corresponding spoke portion S and is supported thereon, is formed in an outer edge part of each of the stationary base portions 25.

Furthermore, a connecting piece portion 27 downwardly extending from the outer edge is formed in each of two stationary base portions 25L and 25R to be placed at the frontward side of the steering wheel W, as illustrated in FIGS. 3, 4, and 6. A nut 27b is fixed to each of the connecting piece portions 27. Further, a screw hole 27a for fixing a corresponding one of the stationary base portions 25L and 25R (that is, the stationary plate 22) to a corresponding one of the spoke portion core metals 5L and 5R with a bolt 8 is formed in each of the connecting piece portions 27.

As shown in FIGS. 7 to 11, 15, and 16, each of stationary support members 29 made of insulating synthetic resins, such as polyacetal, is formed in such a way as to be substantially cylindrically shaped so that an insertion hole 30a is passed through in the central portion thereof. Further, the flange portion 31 and a locking plate portion 34, which extend radially and outwardly, are disposed in a lower part of a substantially cylindrical portion 30 in such a manner as to be spaced apart from each other in an upward or downward direction.

The flange portion 31 is formed like a ring. Further, through holes 31a passed through upwardly or downwardly are formed at four places on a flange portion 31, which are angularly spaced at angular intervals of 90 degrees. A projection part 37f of a contact portion 37e (to be described later) of the stationary contact member 37 is inserted into and passed through each of the through holes 31a. Further, locking ring portions 31b for locking a cut-up claw 37d (to be described later) of the stationary contact member 37 are formed in the flange portion 31 at symmetrical places with respect to the center of the cylindrical portion 30. Furthermore, four ring portions 32 each extending upwardly are provided at places in the vicinity of the corresponding through hole 31a on the outer circumferential edge of the flange portion 31 in such a manner as to protrude therefrom. Each of the ring portions 32 constitutes an engaging portion for locking a corresponding locking projection 46a (to be described later) of the movable support member 45, and is constructed in such a way as to be able to form a switch assembly A by locking each of the locking projections 46a. Incidentally, the flange portion 31 serves as a spring seat for supporting the bottom of the coil spring 39 through the contact portion 37e of the stationary contact member 37.

Two locking plate portions 34 are put together with the bottom surface of the cylindrical portion 30 and disposed at symmetrical places with respect to the center of the cylindrical portion 30 in such a way as to be shaped like a triangular plate that corresponds to the opening shape of the mounting hole 25a of the stationary base portion 25. A substantially semispherical locking projection 34a is formed on the top surface of each of the locking plate portions 34.

Figure 9:
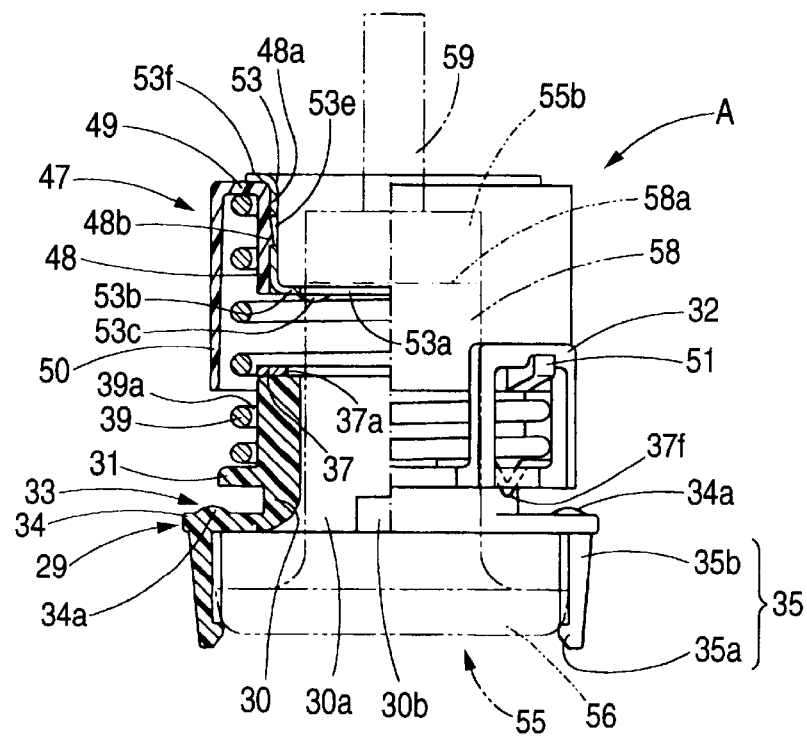
FIG. 9 is a partly sectional view illustrating a switch assembly of this embodiment, which is taken along part of the polygonal line IX—IX of FIG. 7.
Figure 10:
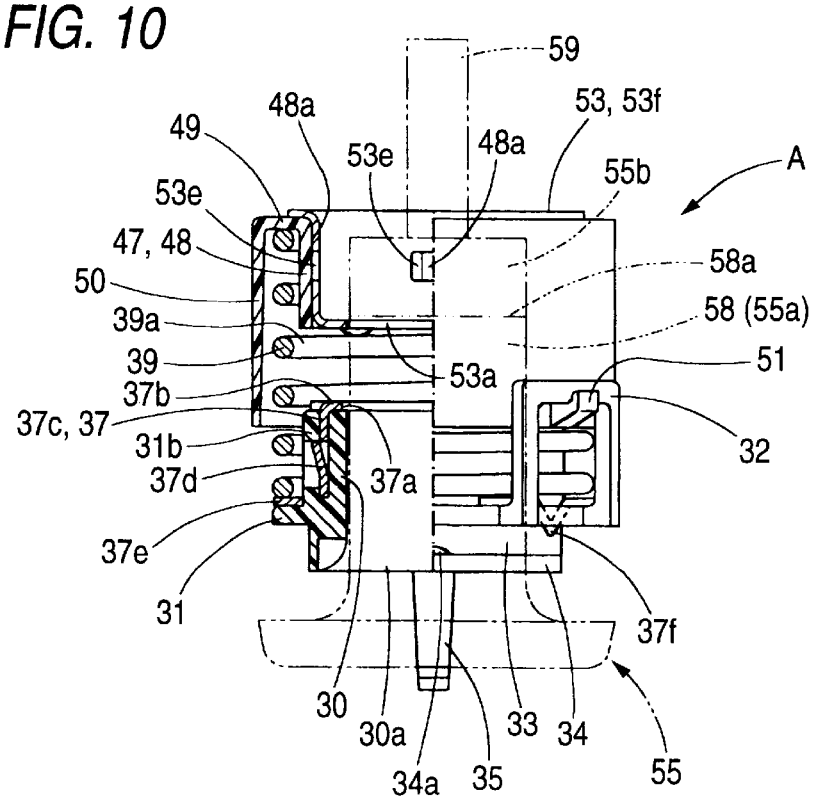
FIG. 10 is a partly sectional view illustrating a switch assembly of this embodiment, which is taken along part of the polygonal line X—X of FIG. 8.

Further, a locking leg 35 downwardly projecting from the bottom surface thereof is formed on each of the locking plate portions 34. A hook portion 35a inwardly bent at the bottom of a stem portion 35b locks the bottom surface of a head portion 56 (to be described later) of the connection bolt 55. Incidentally, the length of the stem portion 35b of each of the locking legs 35 is longer than that of the head portion 56, and set so that the top end of a male screw portion 59 (to be described later) upwardly projects from the movable support member 45 of the switch assembly A, as illustrated in FIGS. 9 and 10, in a state in which the head portion 56 is locked by the hook portion 35a.

The distance between the flange portion 31 and the locking plate portion 34 is set to be substantially equal to the thickness of the stationary base portion 25. The flange portion 31, the locking plate portion 34, and the cylindrical portion 30 provided there between constituting a connection portion 33 for bayonet-connecting the stationary support member 34 to the mounting hole 25a of the stationary base portion 25. That is, the locking plate portions 34 and 34 and the lower portion of the cylindrical portion 30 are passed through the mounting hole 25a. Furthermore, the stationary support member 29 is rotated by 90 degrees in such a way as to put the circumferential edge of the mounting hole 25a between the flange portion 31 and the locking plate portion 34. Thus, the stationary support member 29 is bayonet-connected to the mounting hole 25a of the stationary base portion 25. Incidentally, when the member 29 is bayonet-connected thereto, the locking projection 34a of each of the stationary base portions 25 is fitted into the locking hole 25b of the stationary base portion 25. Thus, the stationary support member 29 is whirl-stopped in the circumferential direction there of. Furthermore, a concave portion 30b, to which a jig is inserted, is formed in the bottom surface portion of the cylindrical portion 30 so that the stationary support member 29 is easily rotated when bayonet-connected thereto.

As shown in FIGS. 7 to 11, 14, and 16, the stationary contact member 37 is formed from spring steel. Moreover, an insertion hole 37a is formed in such a way as to penetrate the central portion thereof. A substantially ring like body portion 37b corresponding to the top end of the cylindrical portion 30 of each of the stationary support members 29 is provided at the top end of the member 37. Moreover, the member 37 has longitudinal wall portions 37c and 37c extending downwardly from both edges of the body portion 37b. Furthermore, the member 37 has four contact portions 37e extending from both sides of the bottom of each of the longitudinal portions 37c like fins. A cut-up claw 37d, from which the top end is cut off, is formed on each of the longitudinal wall portions 37c. Additionally, a projection portion 37f projecting in such a manner as to protrude downwardly is formed in each of the contact portions 37e. The cylindrical portion 30 of each of the stationary support members 29 is fitted into between the longitudinal wall portions 37c and 37c by directing the contact portion 37e to the downward direction. Moreover, each of the cut-up claws 37d is locked by the locking ring portion 31b. Thus, each of the stationary contact members 37 is prevented by from upwardly slipping off. Moreover, each of the members 37 is attached to a corresponding one of the stationary support members 29. When the member 37 is attached thereto, the body portion 37b is supported on the top surface of the cylindrical portion 30 of the stationary support members 29. The projection part 37f of each of the contact portions 37e is downwardly protruded from a corresponding one of the through holes 31a of the stationary support member 29. Further, when the stationary support members 29, to which the stationary contact member 37 is attached, is bayonet-connected to the stationary base portion 25, each of the projection portions 37f comes in contact with a corresponding one of the stationary base portion 25. The stationary contact member 37 is electrically conducted to the negative electrode of the horn operating circuit through the projection part 37f, the stationary plate 22, and the core metals 5L and 5R when the stationary plate 22 is fastened to the spoke portion core metals 5L and 5R with bolts 8.

As shown in FIGS. 2, 3, 5, 7 to 11, and 16, the movable members 41 is constituted by comprising a movable base portion 43, which is connected to a pad 14 for depressing the horn switch H, and a movable support member 47 that is connected to the movable base portion 43 by abutting thereagainst and that supports the movable contact member 53. In the case of this embodiment, the movable base portions 43 comprises three mounting piece portions 18 of the bag holder 15. The bag holder 15 functions as one movable plate 42.

Further, as illustrated in FIG. 11, the nut 44 serving as an electric conductor is embedded in the movable base portion 43 so that an end surface is exposed to the movable contact members 53. The nut 44 is made of steel that is more resistant to oxidizing and has good electrical conductivity, as compared with the bag holder 15 (that is, the support member). Further, a screw hole 44a, into which the male screw portion 59 of the connection bolt 55 is screwed, is provided in the central portion of the nut 44. Furthermore, a lower surface of the nut 44 is exposed to the movable contact member 53 and abuts against the contact portion 53f of the movable contact member 53 and serves as a contact surface 44b against which a large-diameter portion 58 of the connection bolt 55 abuts. Incidentally, the nut 44 is set and disposed in a casting die as an insert when the bag holder 15 is formed by casting.

As illustrated in FIGS. 7 to 11, 13, and 16, each of the movable support members 47 is made of an insulating resin, such as polyacetal, and has a substantially cylindrical portion 48 having a central portion through which an insertion hole 48a penetrates. The member 47 also has a ring-like flange portion 49 outwardly extending from the top end of the cylindrical portion 48. Moreover, the member 47 further has a cylindrical cover portion 50 downwardly extending from the outer circumferential edge of the flange portion 49. A locking projection 48b for assembling the movable contact member 53 is provided on each of opposed sides of the inner circumferential surface of the cylindrical portion 48. A flange portion 49 constitutes a spring seat 49 provided at the top end of the coil spring 39.

Further, a cover portion 50 downwardly extends and covers the coil spring 39 in such a way as to be able to cover the contact part (that is, the body portion 37b, and the convex portion 53c of the body portion 53b), at which the stationary contact member 37 and the movable contact member 53 are in contact with each other during the horn switch H is operated, and the neighborhood thereof even when the horn switch H is not operated. Furthermore, four locking piece portions 51, each of which has a tip end upwardly bent, are provided at places, which are angularly spaced at angular intervals of 90 degrees, on the outer circumference of the bottom part of the cover portion 50 in such a way as to project therefrom. These locking piece portions 51 constitute an engaging portion to be locked onto each of the ring portions 32 of the stationary support member 29, and are used when the switch assembly A is formed by engaging the engaging portions 32 and 51 with each other. Incidentally, the shape of an opening of each of the ring portions 32 and the arrangement positions of the locking piece portions 51 are set so that the movable support member 47 and the stationary support member 29 do not interfere with each other even when these members 47 and 27 are made to come close to each other so as to operate the horn.

As illustrated in FIGS. 7 to 11, 12, and 16, the movable contact member 53 is formed from spring steel and constituted by comprising a substantially ring like body portion 53b having an insertion hole 53a in the central portion thereof, a cylindrical longitudinal wall portion 53d extending upwardly from the outer circumferential edge of the body portion 53b, and a substantially rectangular contact portion 53f extending outwardly from the top end of the longitudinal wall portion 53d. Four convex portions 53c are provided in the body portion 53b in such a manner as to downwardly protrude and as to be able to have point contact with the body portion 37b of the stationary contact member 37. Locking holes 53e are formed at places, which are angularly spaced at angular intervals of 90 degrees, in the longitudinal wall portion 53d. The longitudinal wall portion 53d is fitted into the cylindrical portion 48 from above, and the predetermined locking projections 48b is locked in the locking hole 53e. Thus, the movable contact member 53 is prevented from upwardly slipping off. Moreover, the movable contact member 53 is attached into the movable support member 47. When the movable contact member 53 is attached thereto, the contact portion 53f is supported on the top surface of the flange 49 of each of the movable support members 47, so that the convex portion 53c downwardly projects from the bottom end of the cylindrical portion 48 of the movable support members 47.

As shown in FIGS. 7 to 11 and 16, the coil spring 39 is formed in such a way as to have a substantially cylindrical shape, and provided with an insertion hole 39a in the central portion thereof. The top end of the coil spring 39 is made to abut against the flange portion 49 of the movable support member 47. The bottom end of the spring 39 is made to abut against the flange portion 31 of the stationary support member 29 through the contact portion 37e of the stationary contact member 37.

As illustrated in FIGS. 11 and 16, the connection bolt 55 is constructed by comprising the disc-like head portion 56 and the shank portion 57 upwardly extending from the head portion 56. The shank portion 57 has a top end, at which the male screw portion 59 enabled to be screwed into the screw hole 44a of the nut 44 placed in the movable base portion 43 is formed, and a bottom end, at which a circular-cylinder-like large-diameter portion 58, whose outside diameter is larger than that of the male screw portion 59 and smaller than that of the head portion 56, is formed. The outside diameter of the head portion 56 is larger than the inside diameters of insertion holes 37a, 53a, 30a, 48a, and 39a of the stationary contact member 37, the movable contact member 53, the stationary support member 29, the movable support member 47 and the coil spring 39 of the switch assembly A. The connection bolt 55 is formed so that the locking legs 35 and 35 of the stationary support member 29 are able to lock the bottom surface thereof. Further, the outside diameter of the shank portion 57 is set to be smaller than the inside diameters of the insertion holes 37a, 53a, 30a 48a, and 39a.

Incidentally, in the case of the embodiment, the connection bolt 55 consists of two parts, that is, a bolt body 55a and a washer 55b. The washer 55b is formed like a ring and has an outside diameter, which is equal to that of the large-diameter portion 58, and placed at the top end part of the large-diameter portion 58 and constituted as a part of the large-diameter portion 58. Further, a female screw, to which the male screw portion 59 is screwed, is formed in the washer 55b. Moreover, the threads of the male screw portion 59 are not threaded to the large-diameter portion 58. As shown in FIG. 16, a gap, whose thickness is slightly larger than that of the washer 55b, is provided between a root portion side end portion 59a and the large-diameter portion 58. Thus, the washer 55b is preliminarily screwed to the male screw portion 59 and attached to the bolt body 55a in such a way as to be able to rotate between the root side end portion 59a and the large-diameter portion 58.

Further, when the connection bolt 55 is screwed to the nut 44, the large-diameter portion 58 abuts against the peripheral edge of the screw hole 44a of the contact surface 44b of the nut 44. The top surface of the head portion 56 abuts against the peripheral edge of the mounting hole 25a at the lower surface side of the stationary base portion 25 through the locking plate portion 34 of the stationary support member 29. Thus, the distance between the body portion 37b serving as the contact part of each of the stationary and movable contact members 37 and 53, which are placed in such a manner as to be made only by the pushing force of the coil sprig 39 to get apart from each other, and the convex portion 53c, that is, a horn stroke is restricted. Incidentally, the distance between the body portion 37b and the convex portion 53c, which are contact portions of the stationary and movable members 37 and 53, at the time of assembling the switch assembly A by engaging the engaging portions 32 and 51 with each other is set in such a way as to be slightly larger than the distance at the time of screwing the connection bolt 55 into the nut 44.

The assembling of the switch assembly A is performed by locking the cut-up claws 37d and 37d into the locking ring portions 31b and by then assembling the stationary contact member 37 to the stationary support member 29 and by subsequently locking the locking projection 48b into the locking holes 53e and by thus attaching the movable contact member 53 to the movable support member 31b.

Further, the stationary support member 29 and the movable support member 47 are made to get close to each other through the coil spring 39 so that the bottom end of the coil spring 39 is caused to abut on the flange portion 31 through the contact portion 37e of the stationary contact member 37, and that the top end of the coil spring 39 is caused to abut against the bottom surface of the flange portion 49 of the movable support member 47. Moreover, the locking piece portion 51 is locked in each of the ring portions 32. Thus, the switch assembly A is assembled.

Subsequently, the shank portion 57 is inserted into and passed through the insertion holes 37a, 53a, 30a, 48a, and 39a. Then, the bottom surface of the head portion 56 is locked onto the locking legs 35 and 35. Thus, the connection bolt 55 is assembled to the switch assembly A. Furthermore, the connection portion 33 of the stationary support member 57 is bayonet-connected to the mounting hole 25a of the stationary base portion 25. Three switch assemblies A and the connection bolt 55 are attached to the stationary plate 22.

Incidentally, the connection bolt 55 may be attached thereto by utilizing the locking legs 35 and 35 after the three switch assemblies A are attached to the stationary plate 22.

Further, the movable base portion 43 (that is, the mounting piece portion 18) serving as the bag holder 15 of the preliminarily assembled air bag device 10 is placed above a corresponding one of the switch assemblies A. Then, the connection bolt 55 is rotated from below. Subsequently, the male screw portion 59 is screwed into the screw holes 44a formed in the nut 44 embedded in the movable base portion 43. Thus, the airbag device 10, to which three horn switches H are attached, is formed correspondingly to each of the stationary plates 22.

Incidentally, the practical assembling of the horn switches H to the air bag device 10 is performed by first placing the air bag device 10 on a worktable upside down and by then placing the stationary plate 22 put in a state, in which the male screw portion 59 is protruded from the bottom surface thereof, thereon from above and by subsequently, fastening the connection bolt 55.

Incidentally, as already described above, the air bag device 10 is preliminarily assembled by first placing the retainer 12 in the air bag 11, and then folding the air bag 11, and moreover, inserting each of the bolts 12a, which extend from the retainer 12, into the bag holder 15 and the inflator flange portion 13c and then fastening the bolts 12a with the nuts 12b, and furthermore, locking the locking claw 17a of the bag holder sidewall portion 17 onto each of the locking portions 14c of the pad sidewall portion 14b, and finally fixing the pad wall portion 14b to the bag holder sidewall portion 17 with rivets 19.

Further, the steering wheel W is assembled by first attaching the stationary plate 22 together with the horn switches H to the air bag device 10 and then causing each of the connecting piece portions 27 of the stationary base portions 25L and 25R to abut against a corresponding one of the spoke portion core metals 5L and 5R, and subsequently, passing the core metals 5L and 5R through the core metals 5L and 5R from the rear surfaces thereof, respectively, and finally screwing the bolts 8 into the screw holes 27a of the connecting piece portion 27.

Incidentally, when this steering wheel W is assembled, the boss 4a of the boss portion core metal 4 of the steering wheel body 1 is preliminarily connected to the steering shaft of a vehicle.

Furthermore, when each of the connection bolts 55 is screwed into the corresponding screw hole 44a, the contact portion 53f is pressure-contacted with the contact surface 44b of the corresponding nut 44 by the pushing force of the coil spring 39, so that the movable contact member 53 of each of the horn switches H is electrically conducted to the positive electrode of the horn operating circuit through a lead wire (not shown) connected to the movable plate 42 (or bag holder 15). Further, the stationary contact member 37 of each of the horn switches H is electrically conducted to the negative electrode of the horn operating circuit through the projection part 37f of the contact portion 37e, the stationary plate 22, and the core metals 5L, and 5R when the stationary plate 22 is fastened to the spoke portion core metals 5R and 5L with bolts 8.

In the case of the steering wheel W assembled as described above, when the air bag device 10 is depressed by pushing the pad 14, each of the movable members 41 comes close to the stationary member 21 against the pushing force of the coil spring 39. Thus, the convex part 53c of the body portion 53b is brought into contact with the body portion 37b of the stationary contact portion 37, so that the horn is operated.

Further, when the inflator 13 operates, an expanding gas outputted from the inflator 13 is fed in to the airbag 11. Then, the air bag 11 pushes and opens a ceiling wall portion 14a of the pad 14, so that the air bag 11 largely expands.

Further, in each of the horn switches H of the embodiment, the movable base portion (that is, the support member) 43 is formed from a light metallic material, such as magnesium. A steel nut 44 serving as an electric conductor, whose electric conductivity is higher than that of the movable base portion 43, is embedded in the corresponding movable base portion 43. The nut 44 comes in contact with both the movable contact member 53 and the movable base portion (that is, the support member) 43. That is, the movable contact member 53 does not directly touch the movable base portion 43 but comes in contact with the nut 44 serving as the electric conductor, so that the nut 44 is brought into contact with the movable base portion 43. Therefore, even in the case that the contact portion 53f of the movable contact member 53 is pressure-contacted with the nut 44 only by the upward pushing force of coil spring 39, the nut 44 is more resistant to oxidizing and has high electric conductivity, as compared with the movable base portion 43. Thus, when each of the horn switches H is operated, the movable contact member 53 is reliably conducted to the nut 44. Moreover, because the nut 44 is embedded in and comes in contact with the movable base portion 43 so that the contact area therebetween is larger than the contact area between the nut 44 and the contact portion 53f of the movable contact member 53, the ability to conduct the nut 44 to the movable base portion 43 is ensured even when the surface of the movable base portion 43 is oxidized. As a result, even when the bag holder 15 having the movable base portion (that is, the support member) 43 is formed from light metallic material, the movable contact member 53 is reliably and electrically conducted to the movable base portion (that is, the support member) 43 when operated. Consequently, the horn switches H are reliably operated.

Therefore, each of the horn switches H according to the embodiment enables reduction in the weight of the air bag device 10 and realizes good operability thereof by forming the bag holder 15 from a light metallic material.

Further, the embodiment is configured so that the nut 44 is embedded in the movable base portion 43 as an insert, the surface of the movable base portion 43, which is in contact with the nut 44, is resistant to oxidizing. Thus, the embodiment stabilizes the contact between the nut 44 and the movable base portion 43. Moreover, according to the embodiment, the nut 44 is more reliably conducted to the movable base portion 43.

Furthermore, the embodiment is configured so that the large-diameter portion 58 of the connection bolt 55 abuts against the steel nut 44, whose stiffness is higher than that of the movable base portion 43, instead of the movable base portion (that is, the support member) 43 that is formed from a light metallic material and liable to deform. Thus, when the male screw portion 59 of the connection bolt 55 is screwed thereto, buckling is difficult to occur at a place in the vicinity of the end portion of the screw hole 44a. Moreover, the connection bolt 55 is firmly screwed into the screw hole 44a. Furthermore, backlash or looseness is prevented from occurring when each of the connection bolts 55 is screwed thereto. Consequently, a sufficient mounting strength of each of the horn switches H is ensured.

Further, according to each of the horn switches H of the embodiment, the switch assembly A is formed by engaging the engaging portions 32 and 51 with each other in a state in which the stationary support member 29 and the movable support member 47 respectively supporting the stationary contact member 37 and the movable contact member 53 are intervened by the spring 39 and in which the movable support member 47 is allowed to downwardly move. Thus, the stationary and movable contact members 37 and 53, the stationary and movable support members 29 and 47, and the spring 39 are managed as the switch assembly A without being lost. This is convenient for thereafter handling the steering wheel, for instance, for mounting the horn switches on the stationary base portion 25. Needless to say, there is no fear that the stationary and movable contact members 37 and 53, the stationary and movable support members 29 and 47, and the springs 39 of the switch assembly A interfere with the connection bolt 55 temporarily fastened to the stationary member 21, because such constituent elements of the switch assembly A are substantially cylindrically shaped and have insertion holes 37a, 53a, 30a, 48a, and 39a, respectively.

Furthermore, as shown in FIGS. 9 and 10, in each of the horn switches H of the embodiment, the connection bolt 55 is configured so that a part of the large-diameter portion 58, which is close to the top end portion of the bolt body 55a, protrudes upwardly from the top surface of the body portion 53b in a state in which the head portion 56 is locked by the hook portion 35a. Thus, when assembled, the top end part 58a of the large-diameter portion 58 is not caught in the edge of the bottom surface of the body portion 53b of the movable contact member 53. Consequently, the assembling of the horn switches H is facilitated.

Figure 17:
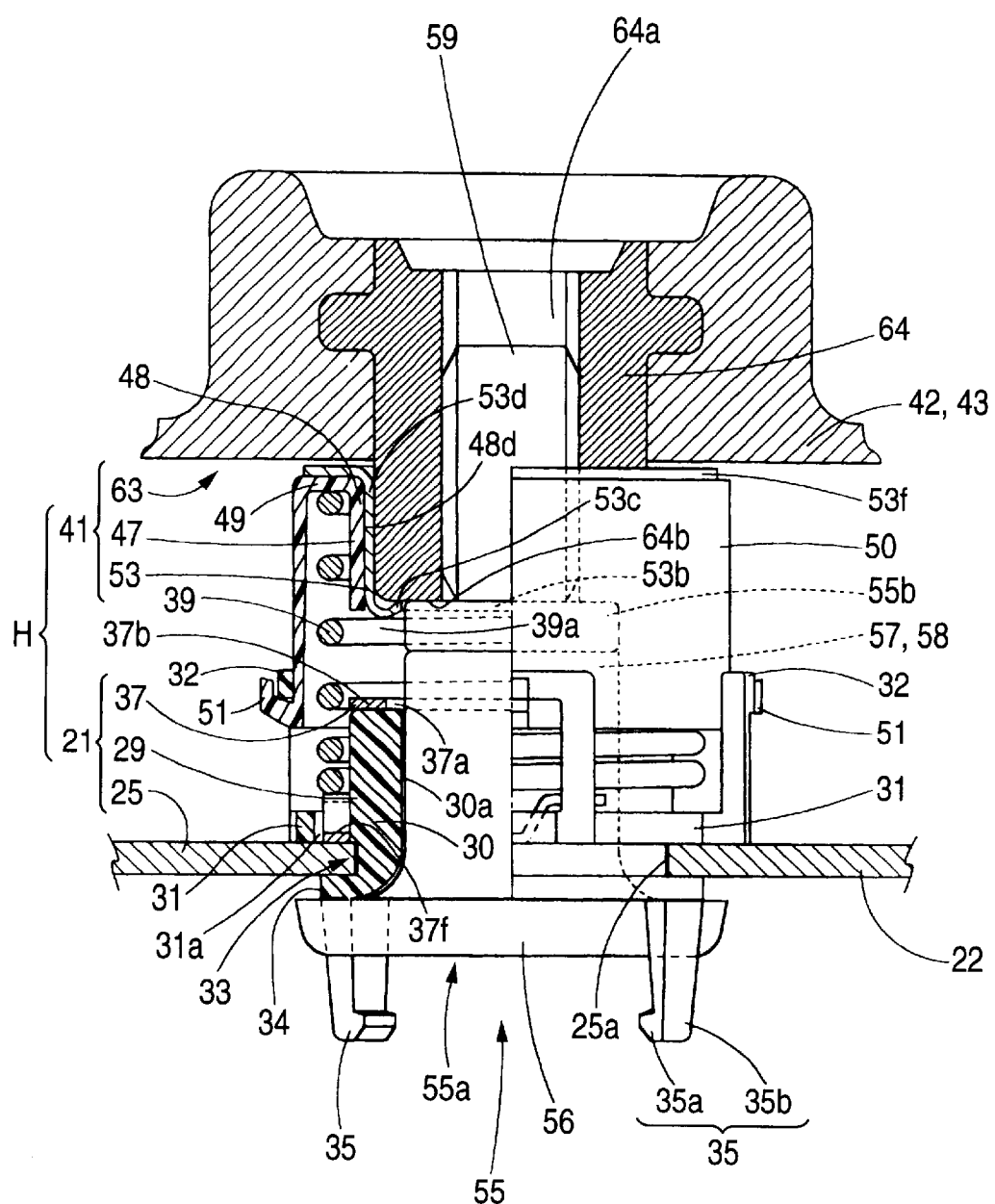
FIG. 17 is an enlarged partly sectional view illustrating the manner of use of each of horn switches, which is another embodiment of the embodiment of the invention.

Incidentally, according to the embodiment, as illustrated in FIG. 11, the movable base portion 43 is configured so that the contact surface 44b of the nut 44 is flush with the bottom surface of the movable base portion 43, and that the contact surface 44b is in contact with the contact portion 53f of the movable contact member 53. However, the shape of the nut is not limited thereto. As illustrated in FIG. 17, a nut 64 serving as an electric conductor, which downwardly projects, may be embedded in a movable base portion (that is, a support member) 63. The nut 64 has a screw hole 64*a* formed in the central portion thereof, and a contact surface 64*b* that is in contact with the top surface of the body portion 53*b* of the movable contact member 53 and with the large-diameter portion 58 of the connection bolt 55. In this case, the top surface of the body portion 53*b* of the movable contact member 53 is pressure-contacted with the contact surface 64*b* of the nut 64 by the pushing force of the spring 39. Thus, the nut 64 is electrically conducted to the positive electrode of the horn operating circuit through a lead wire (not shown) connected to the movable plate 42 (that is, the bag holder 15).

In the case that the movable base portion 63 has such a configuration, even when the nut 64 downwardly protrudes, the connection bolt 55 causes the top end of the male screw portion 59 to slightly and upwardly protrude from the movable support member 45 in a state in which the head portion 56 is locked by the hook portion 35*a*. This facilitates the insertion of the male screw portion 59 into the screw hole 64*a*, which is performed during the horn switch H is assembled. Thus, assembly operability is good.

Figure 18:
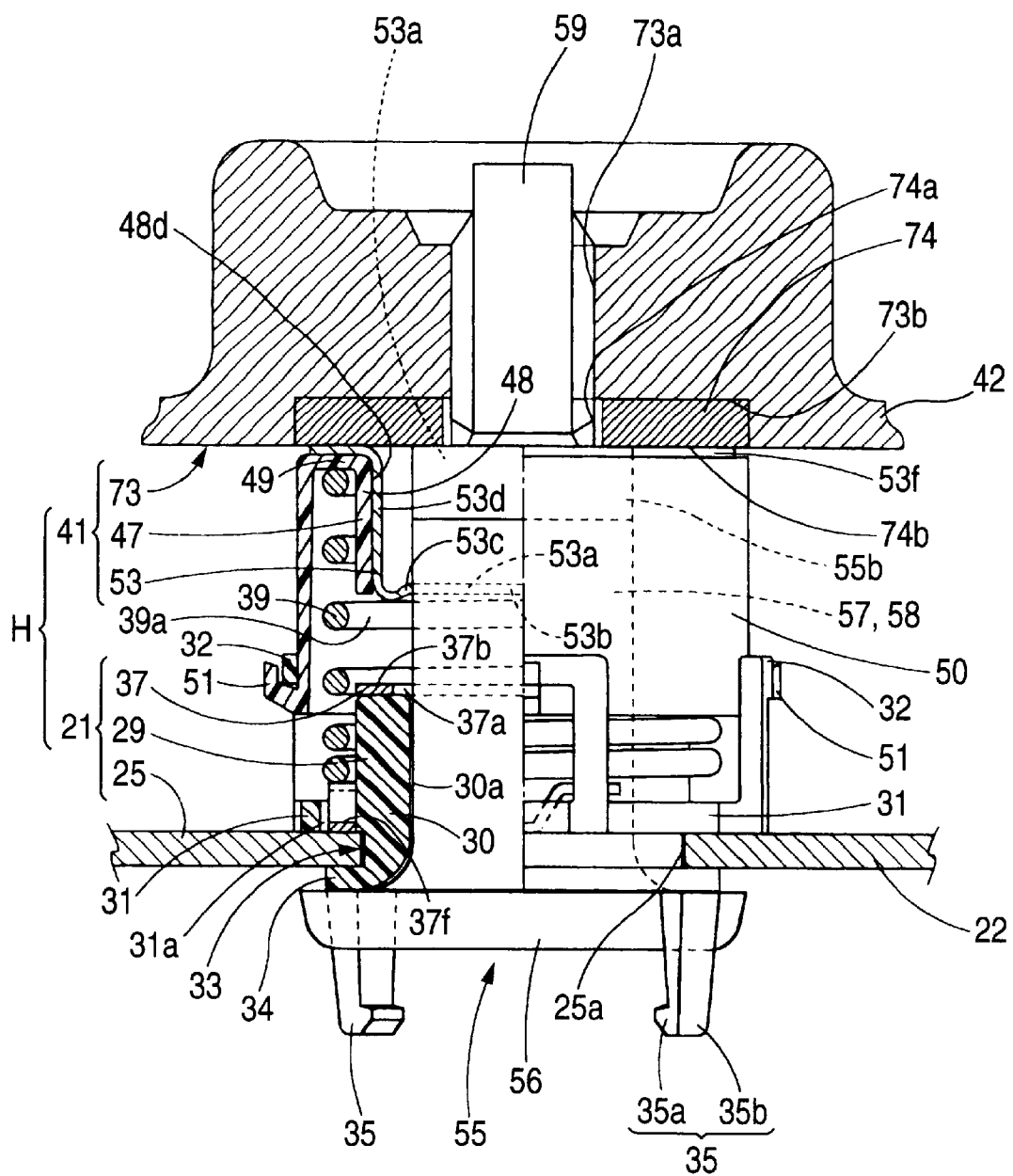
FIG. 18 is an enlarged partly sectional view illustrating the manner of use of ea of horn switches, which is still another embodiment of the embodiment of the invention.

Further, as illustrated in FIG. 18, a fitting recess portion 73*b* may be formed as the movable base portion (that is, the support member) 73 by providing a screw hole 73*a* in the central portion and cutting out the peripheral portion of the screw hole on a lower surface. Further, an annular ring plate 74, which is more resistant to oxidizing and has higher conductivity than the movable base portion 73, maybe disposed in the fitting recess portion 73*b* as the electric conductor. The plate 74 has an insertion hole 74*a*, which communicates with the screw hole 73*a* and permits the male screw portion 59 to pass therethrough, in the central portion thereof. A (bottom) surface of the plate 74, which is exposed to the movable contact member 53, is employed as the contact surface 74*b* that is brought into contact with the contact portion 53*f* of the movable contact member 53 and with the large-diameter portion 58 of the connection bolt 55.

In the case that the movable base portion 73 has such a configuration, the plate 74 is in contact with almost the entire inner surface of the fitting concave portion 73*b* of the movable base portion 73. Thus, the plate 74 is in contact with the movable base portion 73 so that the contact area therebetween is larger than the contact area between the plate 74 and the contact portion 53*f* of the movable contact member 53. Further, the plate 74 is pushed against the movable base portion 73 by being fastened with the connection bolt 55. This ensures the contact between the plate 74 and the movable base portion 73 and also ensures sufficient electric conductivity. Moreover, with the aforementioned configuration, the connection bolt 55 is fastened by causing the large-diameter portion 58 of the connection bolt 55 to abut against the contact surface 74*b* of the plate 74. When the male screw portion 59 is screwed into the screw hole 73*a*, the connection bolt 55 does not abut directly against the circumferential edge of the screw hole 73*a*. Therefore, buckling of the circumferential edge of the screw hole 73*a* is difficult to occur. Thus, the connection bolt 55 is firmly screwed into the screw hole 73*a*. Consequently, a sufficient mounting strength is ensured. Furthermore, as compared with the case that the nuts 44 and 64 are set and disposed in a casting die as an insert when the bag holder 15 is formed by casting, the manufacturing cost is reduced.

Figure 19:
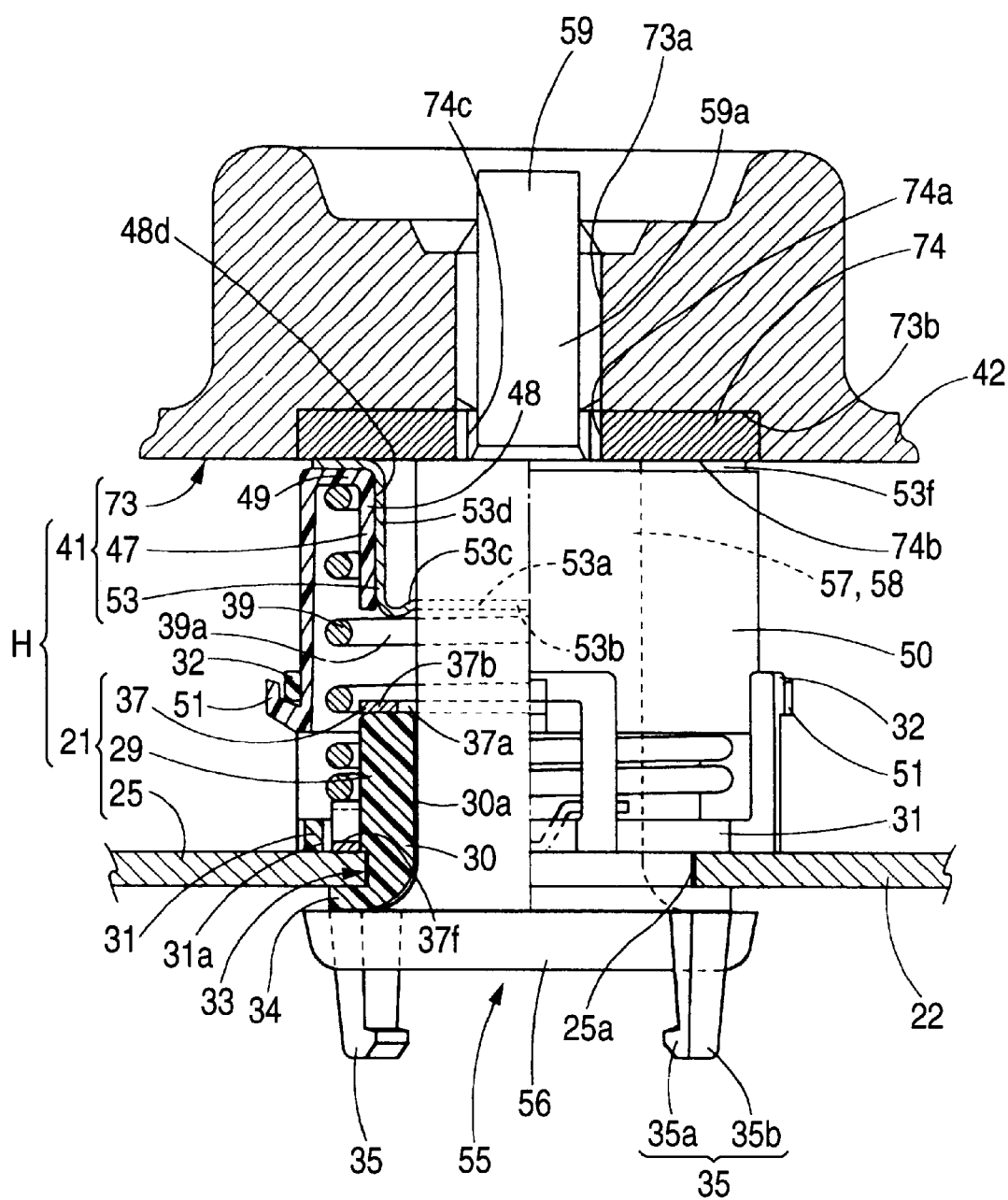
FIG. 19 is an enlarged partly sectional view illustrating the manner of use of each of horn switches, which is still another embodiment of the embodiment of the invention.

Further, in the case that the movable base portion 73 has the aforementioned configuration, as illustrated in FIG. 19, a female screw 74*c*, into which a male screw portion 59 can be screwed, is formed in the inner circumferential surface portion of the insertion hole 74*a* of each of the plates 74. Thus, when the switch assembly A is mounted on the stationary plate 22, the plate 74 is preliminarily and temporarily attached to the connection bolts 55. Practically, the male screw portion 59 is screwed into the plate 74 so that the plate 74 is able to rotate between the root-portion-side end portion 59*a* and the large-diameter portion 58. Thus, the plate 74 is temporarily fixed to the body portion 55*a* of the connection bolt 55. Thus, each of the connection bolts 55 is fastened in a state in which the plate 74 is held by the connection bolt 55. Consequently, this embodiment saves time and effort required to place the plate 74 in the corresponding fitting concave portion 73*a* when the connection bolt 55 is fastened. Moreover, the plate 74 is managed without being lost. Thus, the handle ability of the plates 74 is favorably improved. Furthermore, in the case of employing such a configuration, the plate 74 plays a role of the washer 55*b*. Thus, there is no necessity for providing a washer in each of the large-diameter portions 58, as illustrated in FIG. 19.

Figure 20:
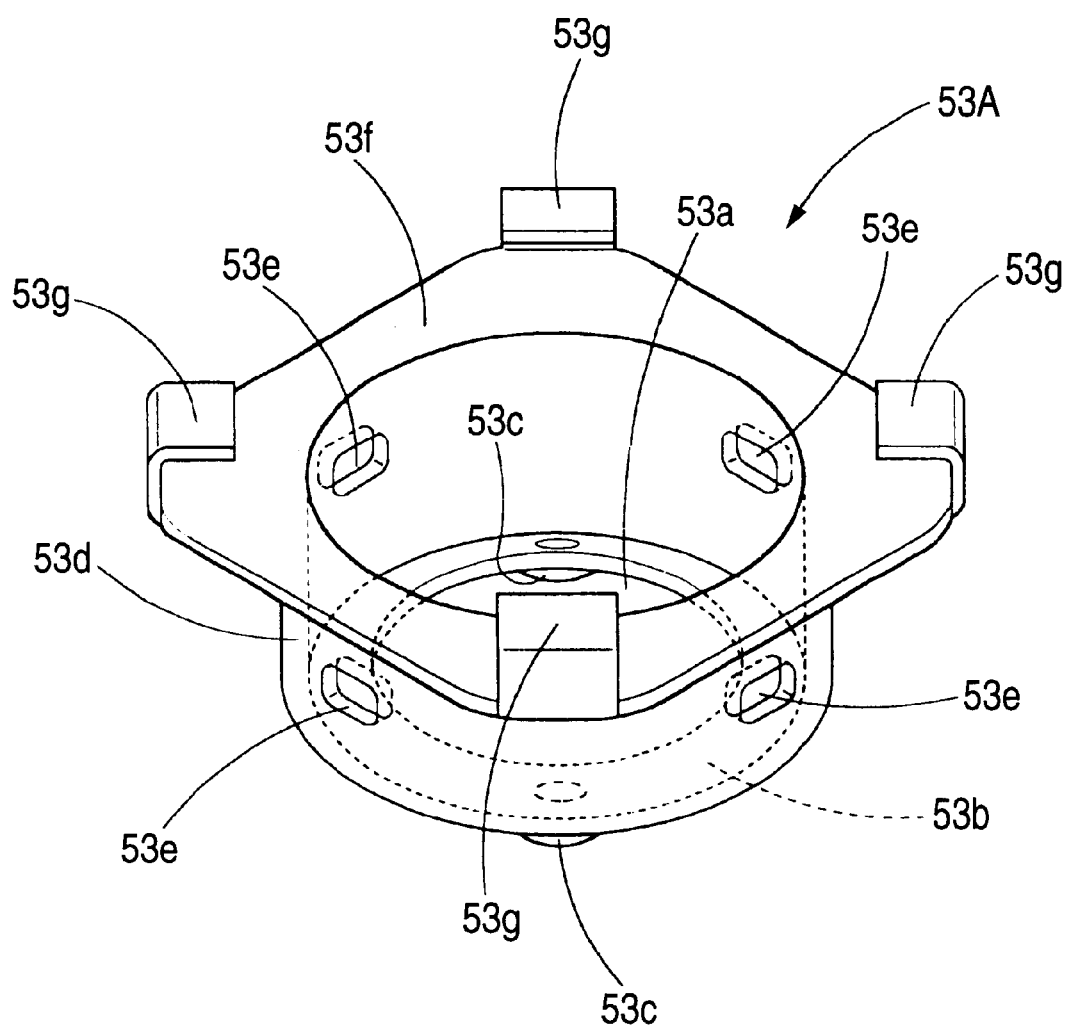
FIG. 20 is a perspective view illustrating a movable contact member to be used in each of horn switches, which is still another embodiment of the invention.
Figure 21:
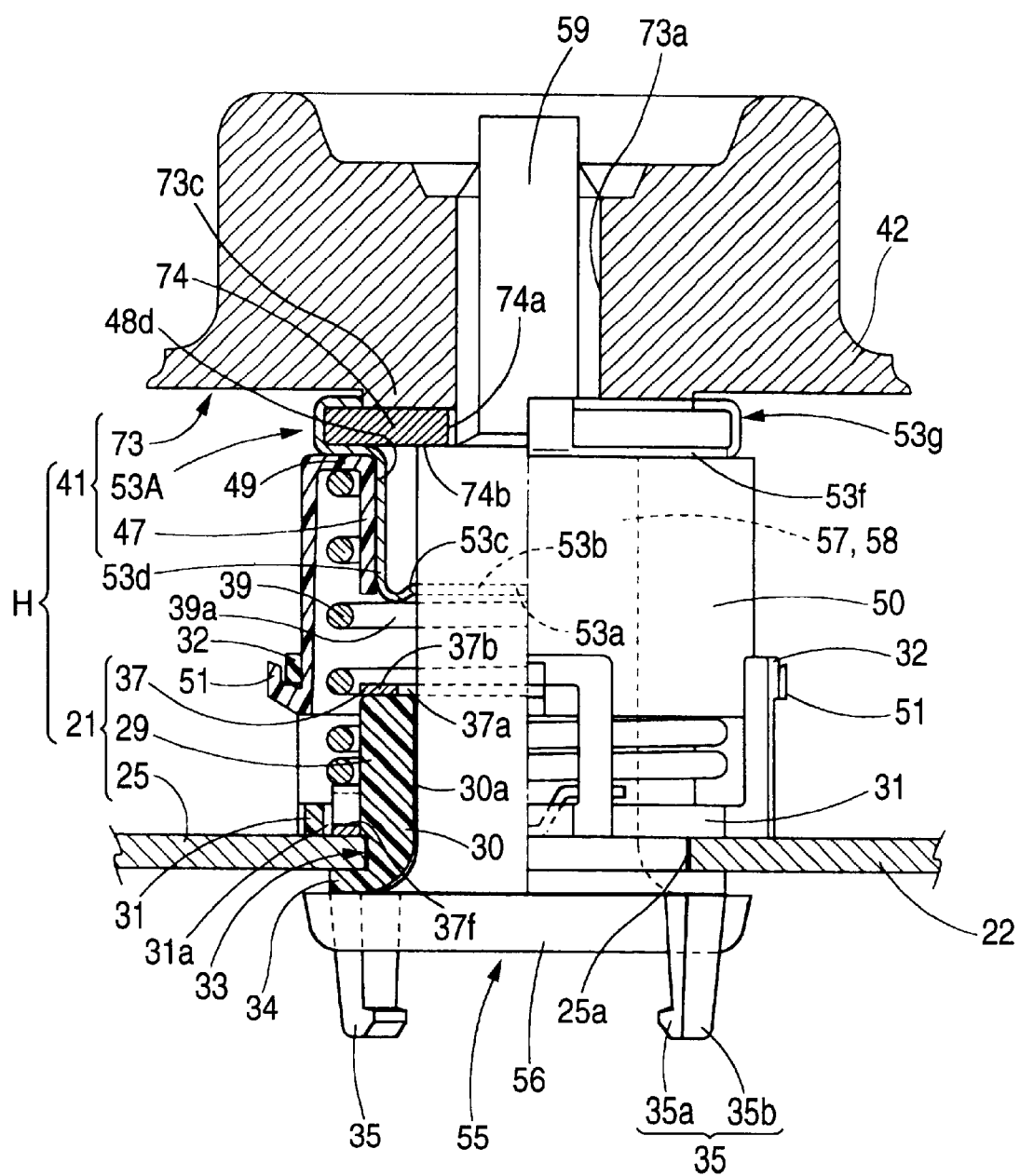
FIG. 21 is an enlarged partly sectional view illustrating the manner of use of the horn switch using the movable contact member of FIG. 20.

Further, the plate 74 may be temporarily fixed to the movable contact member 53A. Practically, as shown in FIGS. 20 and 21, this embodiment may be modified so that locking claw portions 53*g* projecting from the circumferential edge of the contact portion 53*f* of the movable contact member 53 to the movable base portion 73 are formed at a plurality of places (in the case shown in FIG. 20, at four corners of the contact portion 53*f*), that the plate 74 is mounted on the protruded portion 73*c* as well as the plate 74 is placed between the contact portion 53*f* and a group of the locking claw portions 53*g*, and that the plate 4 is temporarily fixed thereto by the group of the locking claw portions 53*g*. Incidentally, after the plate 74 is placed thereto, the locking claw portions 53*g* are formed by bending thereof. Further, the part provided on the circumferential edge of the screw hole 73*a* of the movable base portion 73 slightly projects to the plate 74 so that the movable base portion 73 comes into contact with the plate 74. Furthermore, no female screws are formed on the inner circumferential surface of the insertion hole 74 of each of the plates 74. Furthermore, the male screw portion 59 of the connection bolt 55 is enabled to be inserted into the insertion hole 74*a* and to be passed therethrough. Additionally, the plate 74 is locked by the group of the locking claw portions 53*g* in such a way as to be able to rotate in the circumferential direction.

Even in the case that the plate 74 is temporarily fixed to the movable contact member 53A, the plate 74 is pushed against the movable base portion 73 by fastening the connection bolt 55. Thus, even when the surface of each of the movable base portions 73 is oxidized, the ability to conduct the plate 4 to the movable base portion 73 is ensured. Consequently, even in the case that the bag holder 15 having the movable base portion (that is, the support member) 73 is made of a light metallic material, the movable contact member 53 is reliably conducted to the movable base portion (that is, the support member) 73 when operated. Thus, the horn switches H are reliably operated.

Incidentally, in the aforementioned configuration, the locking claw portions 53*g* are disposed at the four corners of each of the contact portions 53*f*. However, the places, at which the locking claw portions 53*g* are disposed, are not limited thereto. For example, each of the locking claw portions 53*g* may be disposed at the center of a corresponding one of the sides of the circumferential edge of the corresponding contact portion 53*f*.

Further, in the case that each of the movable base portions 73 has the aforementioned configuration, after the plate 74 is temporarily fixed to the movable contact member 53 by utilizing the locking claw portions 53g, the corresponding movable contact member 53A is attached to the movable support member 47. Thus the switch assembly A is assembled, similarly as in the case of the aforementioned embodiment. Subsequently, when the connection bolt 55 is attached to the switch assembly A, the horn switches H are attached to the air bag device 10 by following the procedure similar to that in the aforementioned embodiment.

Figure 22:
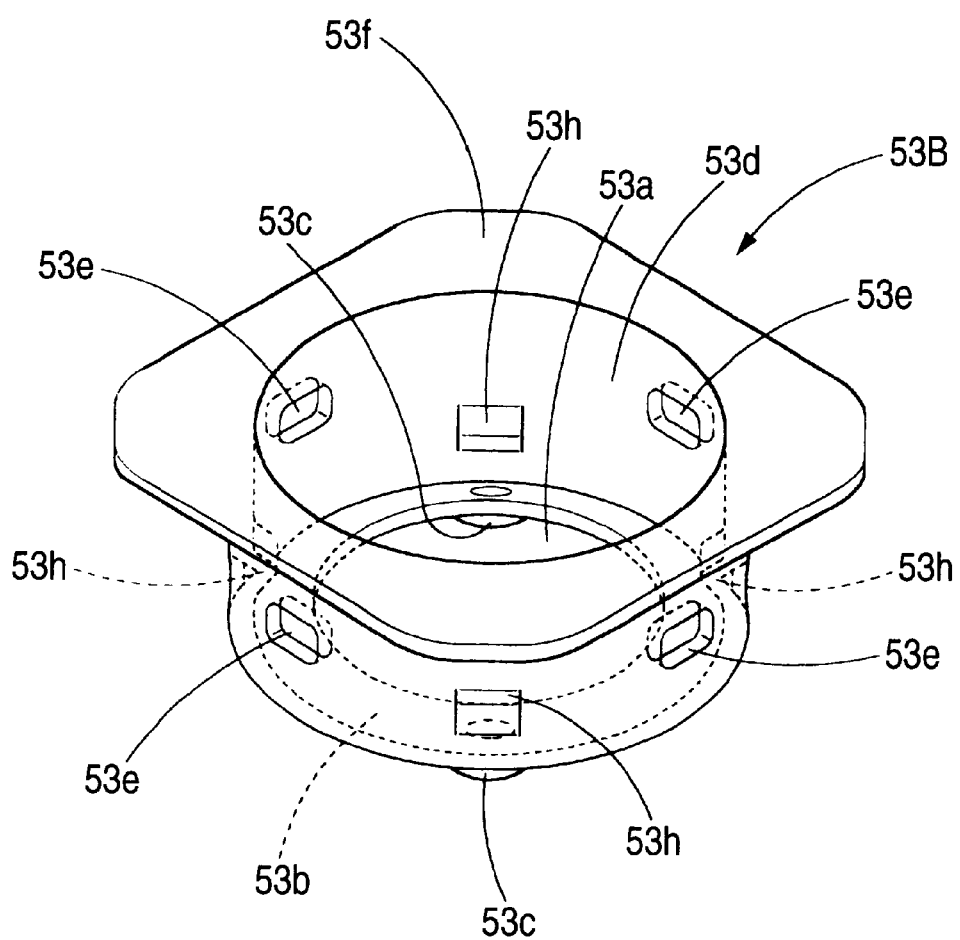
FIG. 22 is a perspective view illustrating a movable contact member to be used in each of horn switches, which is still another embodiment of the invention.
Figure 23:
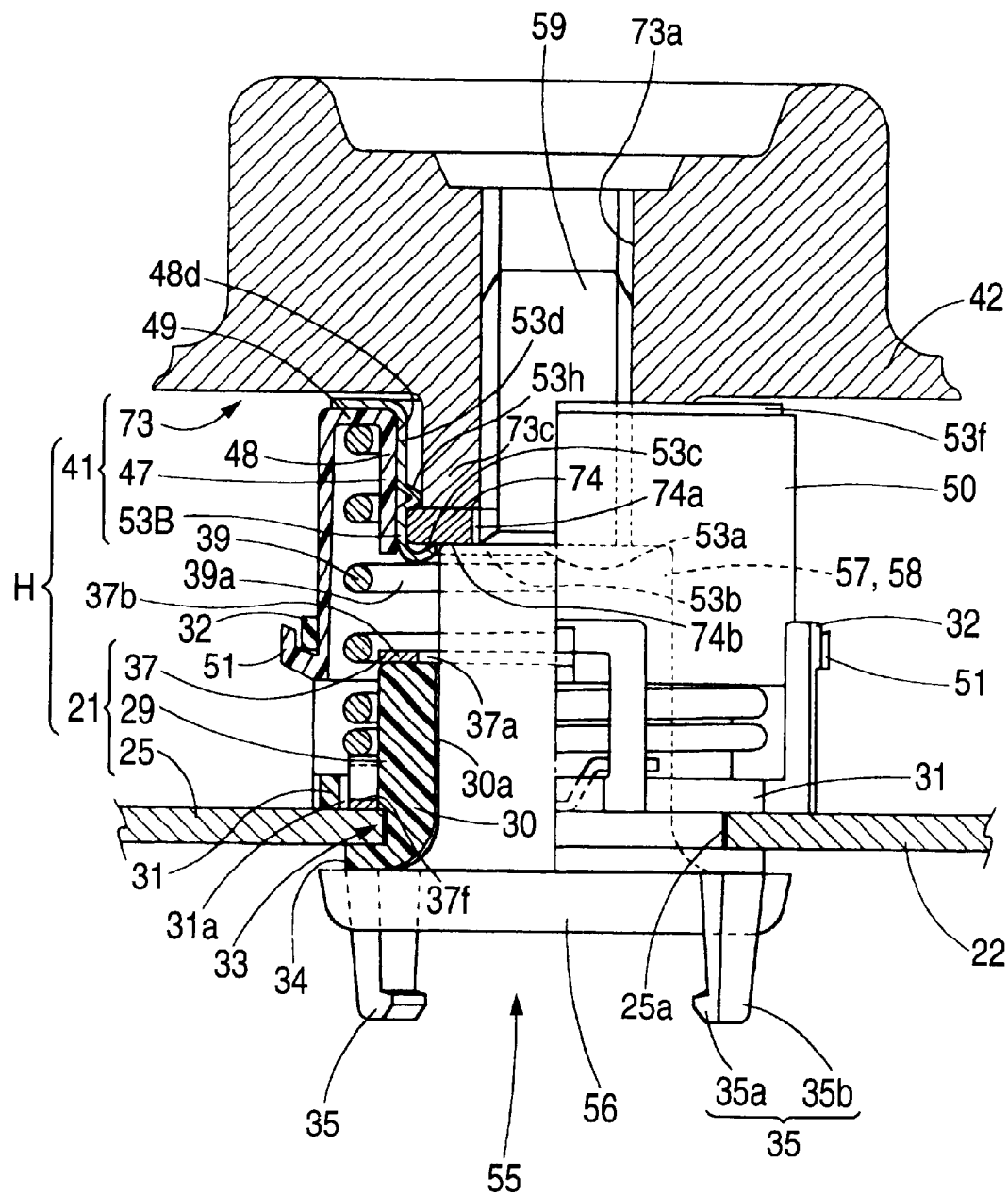
FIG. 23 is an enlarged partly sectional view illustrating the manner of use of each of the horn switches, which uses the movable contact member of FIG. 22.

Further, the method of temporarily fixing the plate 74 to the corresponding movable contact member 53, and the place, at which the plate 74 is temporarily fixed to the movable contact member 53, are not limited to those described above. For instance, as shown in FIGS. 22 and 23, projection portions 53h projecting inwardly are formed at a plurality of places (in the case illustrated in the figures, at four places) on the longitudinal wall portion 53d of the movable member 53B. The plate 74 is mounted on the protruded portion 73c as well as it is placed between the body portion 53b and each of the projection portions 53h. As shown in FIG. 22, these projection portions 53h are formed at places at which the portions 53h do not interfere with the locking holes 53e. In this case, each of the insertion holes 74a, into which the plate 74 is inserted, is not provided with a female screw. Thus, the male screw portion 59 of the connection bolt 55 is permitted to pass therethrough. Furthermore, each of the plates 74 is attached to the projection portions 53h in such a way as to be able to rotate in the circumferential direction. Moreover, as shown in FIG. 23, the part provided on the circumferential edge of the screw hole 73a of the movable base portion 73 protrudes inwardly to the plate 74 so that the movable base portion 73 comes in contact with the plate 74. In the case of employing such a configuration, the body portion 53b of the movable contact member 53B is pressure-contacted with the contact surface 74b of the plate 74. Thus, the contact member 53B is electrically conducted to the positive electrode of the horn operating circuit through a lead wire (not shown) connected to the movable plate 42 (thus, the bag holder 15).

Incidentally, although the projection portions 53h are formed at the four places in the embodiment illustrated in the figures, it is sufficient that the projection portions 53h are disposed at a plurality of places. Furthermore, the shape of each of the projection portions 53h is not limited to that shown in the figures. For example, a part of the longitudinal wall potion 53d may be cut up in such a way as to protrude inwardly.

Figure 24:
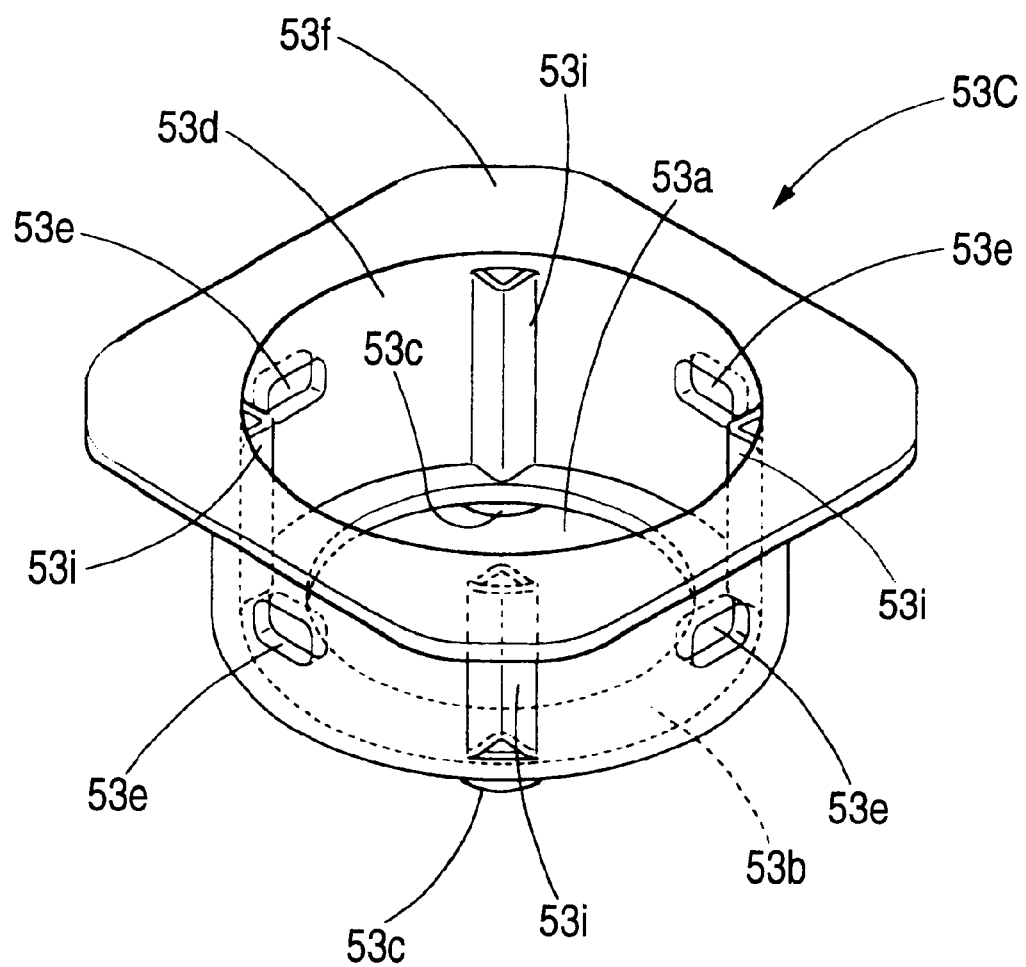
FIG. 24 is a perspective view illustrating a movable contact member to be used in each of horn switches, which is still another embodiment of the embodiment.
Figure 25:
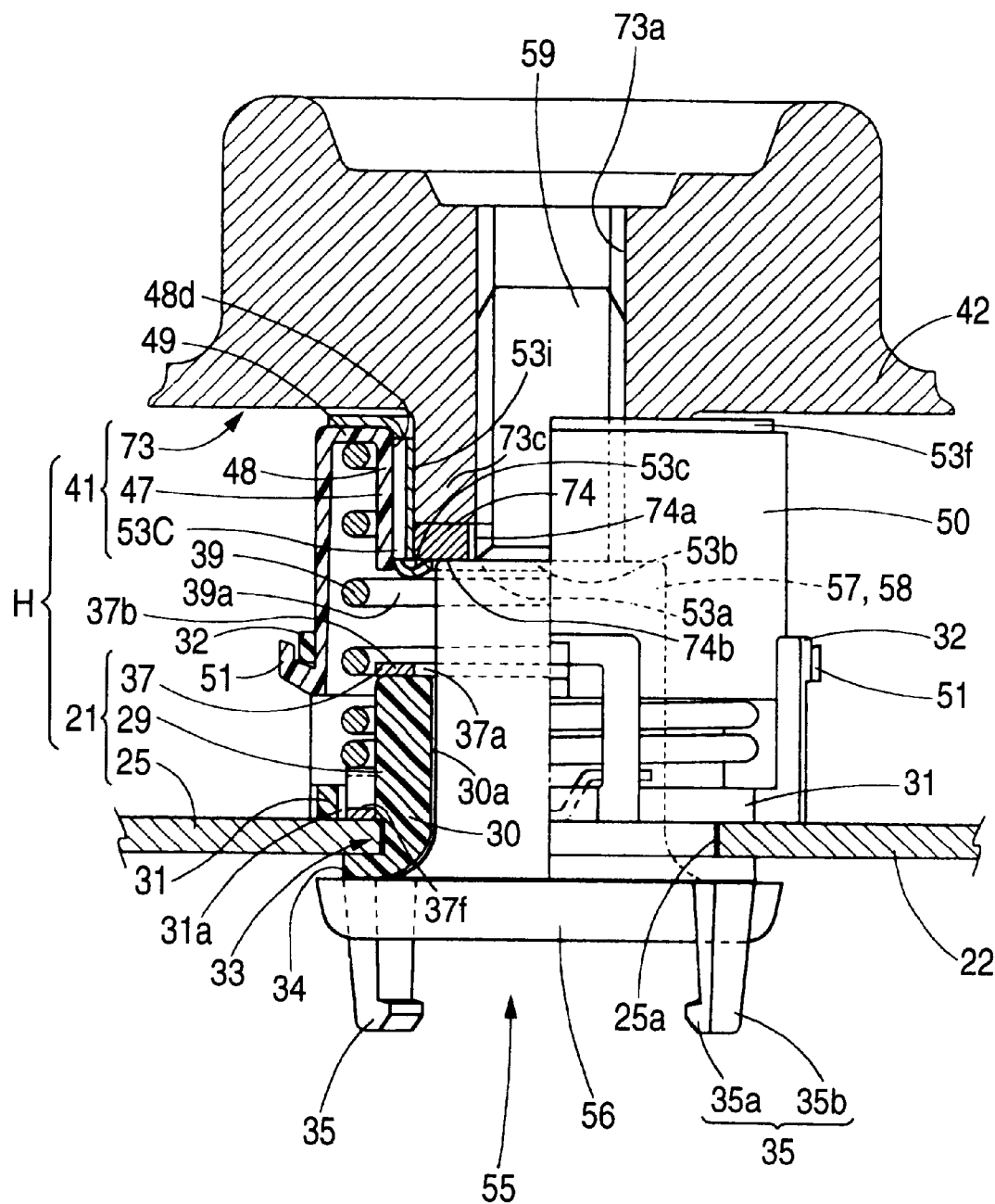
FIG. 25 is an enlarged partly sectional view illustrating the manner of use of each of the horn switches, which uses the movable contact member of FIG. 24.

Further, as illustrated in FIGS. 24 and 25, this embodiment may be constructed so that a plurality of ribs (in the case of the embodiment illustrated in these figures, four ribs) 53i inwardly projecting are disposed on the longitudinal wall portion 53d along the axis of the insertion hole 53a, and that the protruded portion 73c of the plate 74 is temporarily fixed thereto by being pushed from the side of the contact portion 53f in such a way as to abut against the body portion 53b and as to outwardly push and deform the ribs 53i. At that time, the plate 74 is held in such away as to be prevented from dropping and as to be able to rotate during the connection bolt 55 is attached thereto. Incidentally, although the four ribs 53i are formed in the case of this embodiment illustrated in the figures, the number of ribs 53i is not limited to four. This embodiment may be modified so that a single rib 53i is disposed thereon. However, it is preferable from the viewpoint of stability of the temporarily fixed plate 74 that a plurality of corresponding ribs are disposed thereon.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A horn switch for a steering wheel comprising:

a first contact member and a second contact member, which operate a horn when brought into contact with each other;

a support member, which is formed from a die casting made of a light metallic material that supports said first contact member;

a coil spring located between said first and second contact members to push said first contact member against said support member to cause said first contact member to separate from said second contact member; and an electric conductor, the conductivity of which is higher than that of said support member, located between said first contact member and said support member such that the conductor contacts said first contact member and said support member, wherein:

said steering wheel comprises a steering wheel body and an air bag device including a bag holder formed from a light metallic material;

said support member is constructed as a movable base portion located on said bag holder;

said second contact member comprises a stationary contact member supported on a top surface side of a stationary base portion placed at a side of said steering wheel body;

said first contact member comprises a movable contact member supported on a bottom surface side of said movable base portion placed above said stationary base portion;

said electric conductor is formed from a material that has a greater stiffness than that of said support member, and the electric conductor is placed between said movable contact member and said movable base portion in such a way as to come in contact with both of said movable contact member and said movable base portion;

said steering wheel horn switch further comprises a connection bolt that is placed between said movable base portion and said stationary base portion in a manner to allow said movable base portion to downwardly move and to restrict a separation distance from said stationary base portion to said movable base portion, said connection bolt comprising a head portion, which abuts against a bottom surface side of said stationary base portion, and a shank portion, which upwardly extends from said head portion and is screwed into a screw hole formed in said movable base portion;

said shank portion comprises a small-diameter male screw part being formed in a tip end thereof and being screwed into the screw hole, and a substantially cylindrical large-diameter part between said male screw part and said head portion;

each of said movable contact member and said stationary contact member has an insertion hole, through which said shank portion of said connection bolt is able to be inserted, and each is substantially cylindrical;

said male screw part is screwed into the screw hole so that said large-diameter part of said connection bolt abuts against said electric conductor;

said electric conductor is constituted as a nut that is embedded in said movable base portion as an insert when said bag holder is formed by casting; and said nut has said screw hole, into which said male screw part of said connection bolt is able to be screwed, and is enabled to abut against said large-diameter part of said connection bolt.

2. A horn switch for a steering wheel comprising:

a first contact member and a second contact member, which operate a horn when brought into contact with each other;

a support member, which is formed from a die casting made of a light metallic material that supports said first contact member;

a coil spring located between said first and second contact members to push said first contact member against said support member to cause said first contact member to separate from said second contact member; and an electric conductor, the electric conductivity of which is higher than that of said support member, located between said first contact member and said support member such that the conductor contacts said first contact member and said support member, wherein:

said steering wheel comprises a steering wheel body and an air bag device including a bag holder formed from a light metallic material, the bag holder being located above said steering wheel body;

said support member is disposed on said bag holder; and said second contact member is located on said steering wheel body; and said electric conductor comprises a nut that is embedded in said support member in such a manner that a contact area between said nut and said support member is larger than that between said nut and said first contact portion.

3. A horn switch for a steering wheel according to claim 2, wherein said nut is formed of steel.

4. A horn switch for a steering wheel according to claim 2, wherein a contact surface of said nut is substantially flush with a bottom surface of said support member.

5. A horn switch for a steering wheel according to claim 2, wherein said nut protrudes from a bottom surface of said support member.

* * * * *